United States Patent [19]
McKean et al.

[11] 3,726,136
[45] Apr. 10, 1973

[54] DRILLING-FLUID CONTROL-MONITORING APPARATUS

[75] Inventors: George W. McKean; Hugh H. Benson, both of Oklahoma City, Okla.

[73] Assignee: Petro-Electronics, Inc., Oklahoma City, Okla.

[22] Filed: Dec. 17, 1970

[21] Appl. No.: 99,136

[52] U.S. Cl. ................................... 73/155, 175/48
[51] Int. Cl. .......................................... E21b 47/04
[58] Field of Search ........................ 73/155, 432 HA; 175/38, 48; 166/250

[56] References Cited

UNITED STATES PATENTS

| | | | |
|---|---|---|---|
| 2,290,408 | 7/1942 | Crites | 73/155 |
| 3,608,653 | 9/1971 | Rehm | 175/38 |
| 3,407,661 | 10/1968 | Knauth | 73/311 |
| 2,516,452 | 7/1950 | Giers et al. | 73/311 |
| 227,576 | 5/1880 | Read | 73/229 X |

*Primary Examiner*—Jerry W. Myracle
*Attorney*—Dunlap, Laney, Hessin & Dougherty

[57] ABSTRACT

A control-monitoring apparatus, which is adapted to cooperate in a drilling-fluid circulation system, having a level indicating apparatus to sense the level change of the drilling-fluid in the fluid-pits and to provide an output level-signal in response thereto; a pump transducer is connected to each pump, each pump transducer being connected to a flow register which provides an indication of the total volume of drilling-fluid being moved through a pump; and a return-flow indicator to provide an output return flow-signal indicative of the flow of drilling-fluid through the return flow line. The control-monitoring apparatus being constructed to provide the necessary drilling-fluid parameters during the drilling operation when the drilling-fluid is being circulated through the borehole, and during the initial filling of the borehole with drilling-fluid prior to the beginning of the drilling operation.

33 Claims, 8 Drawing Figures

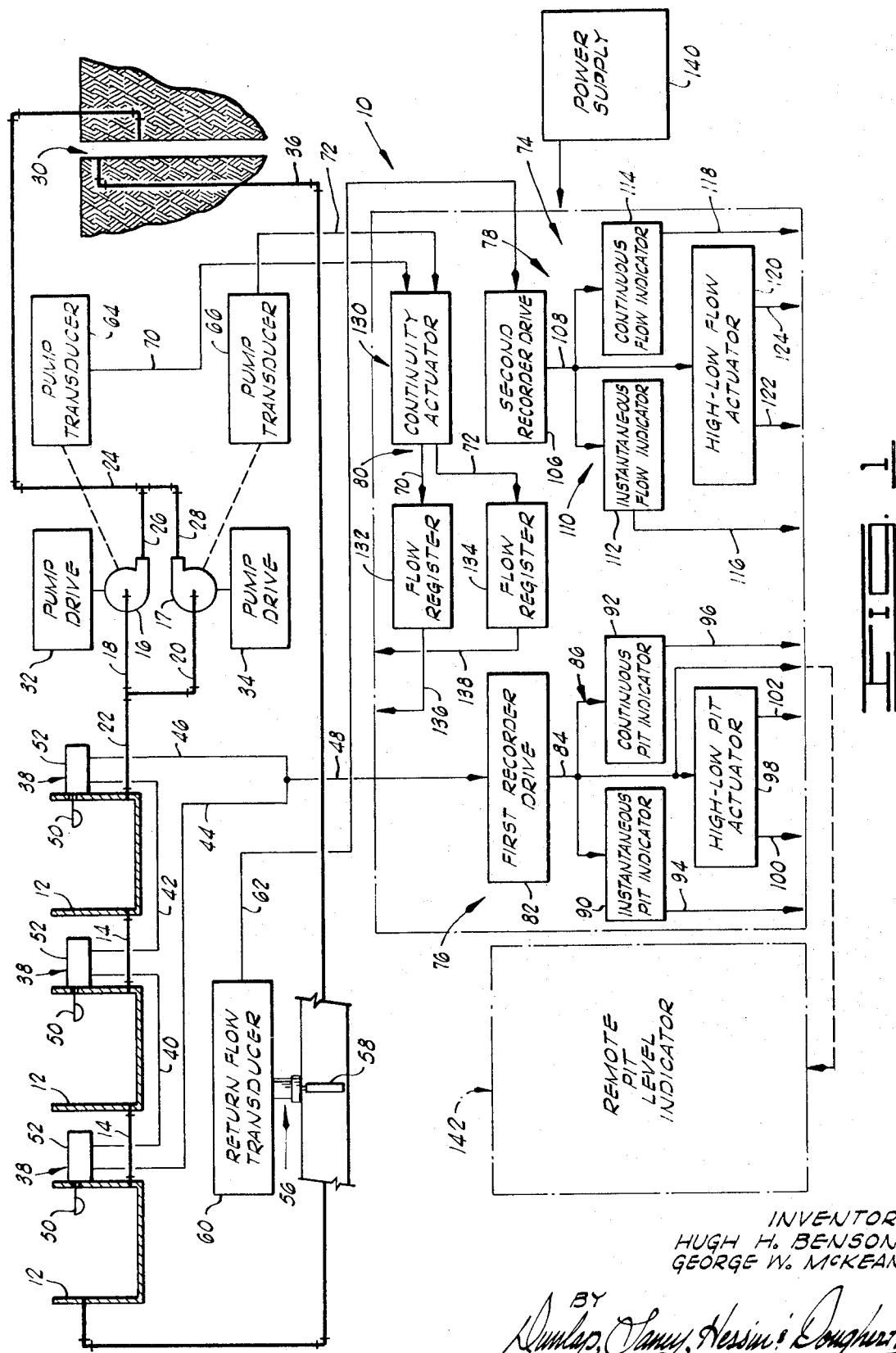

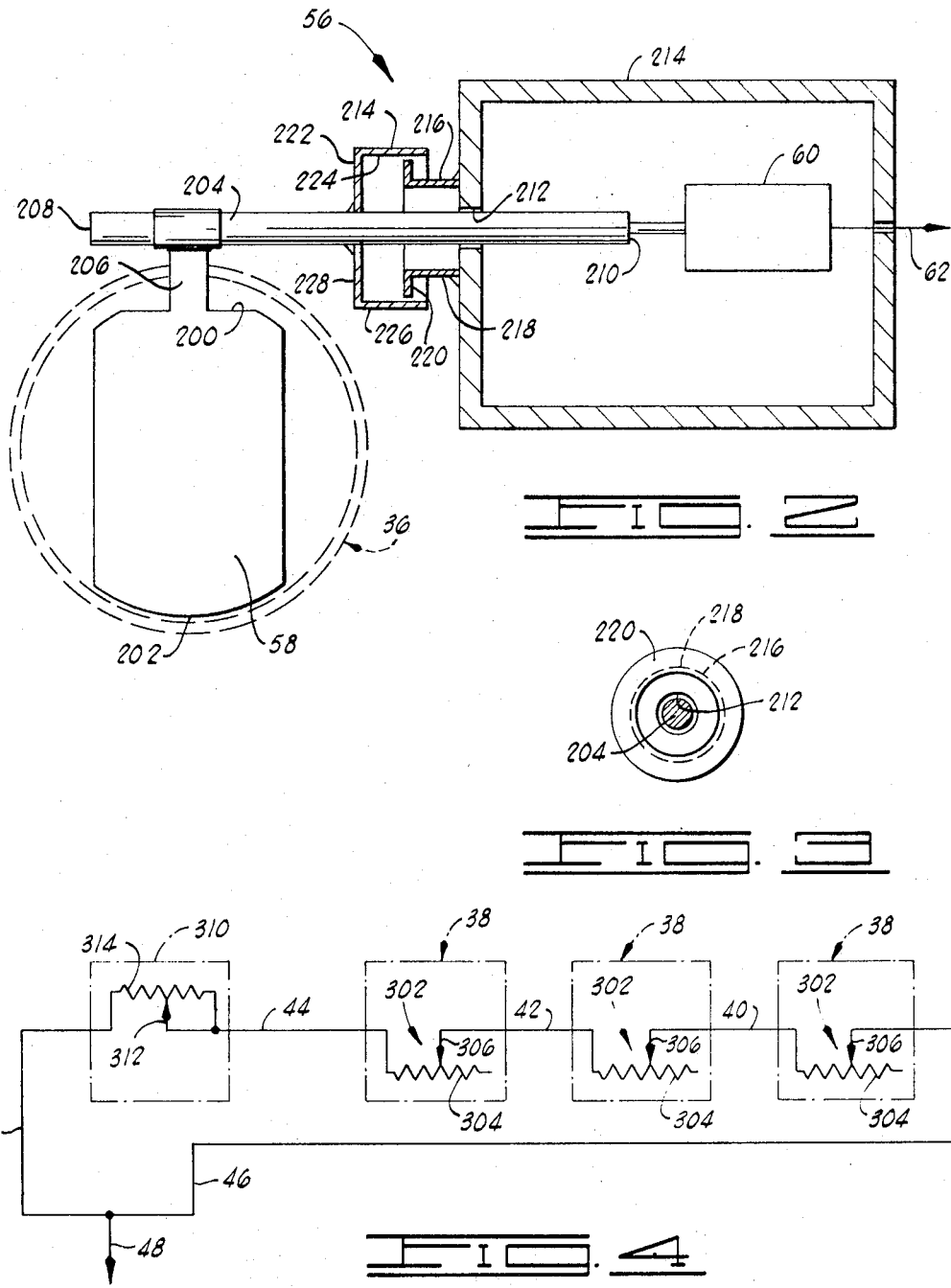

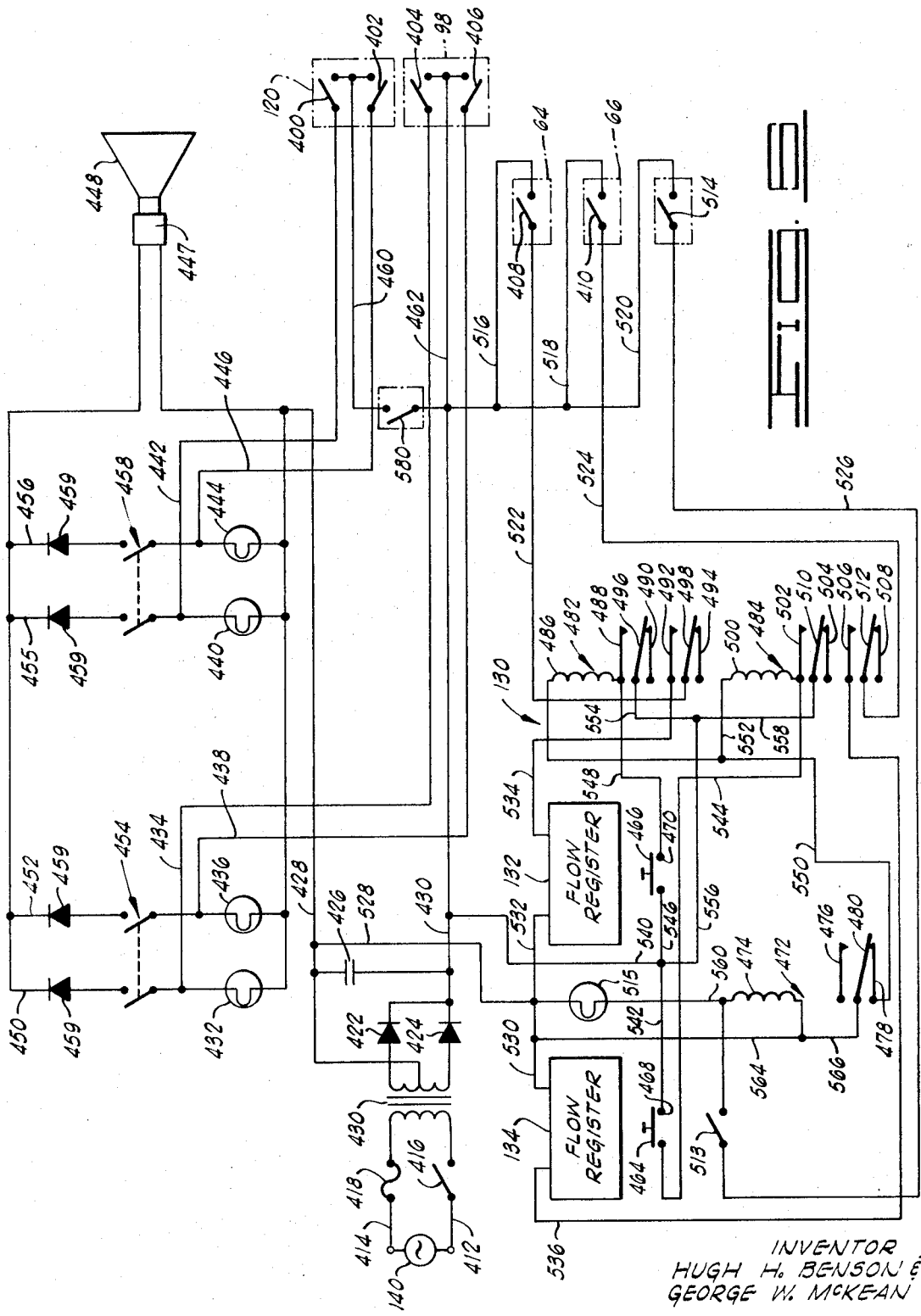

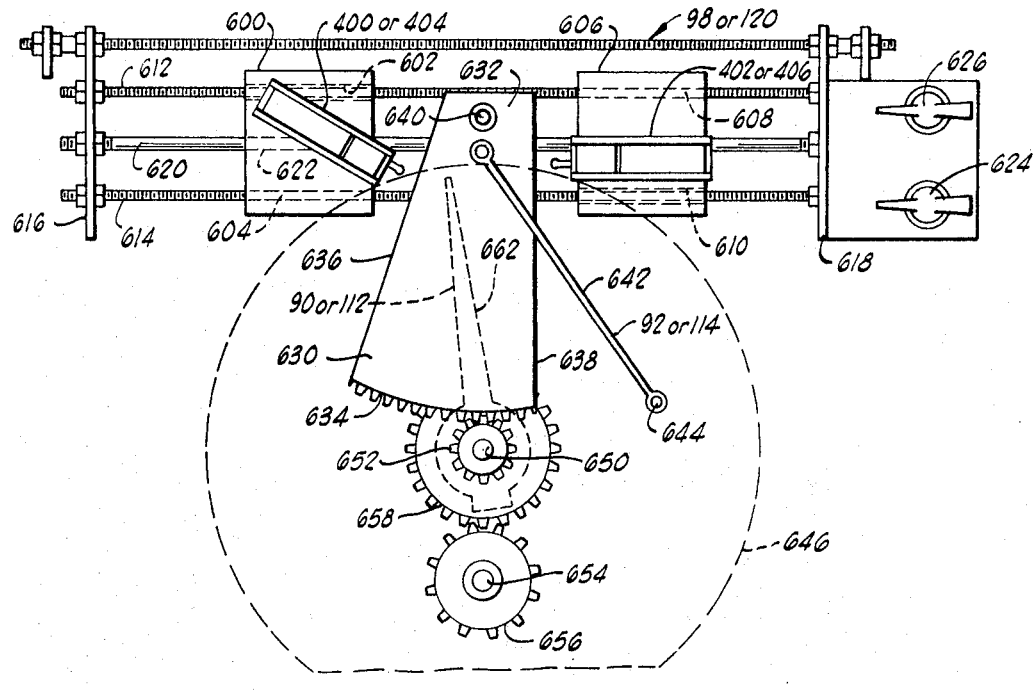
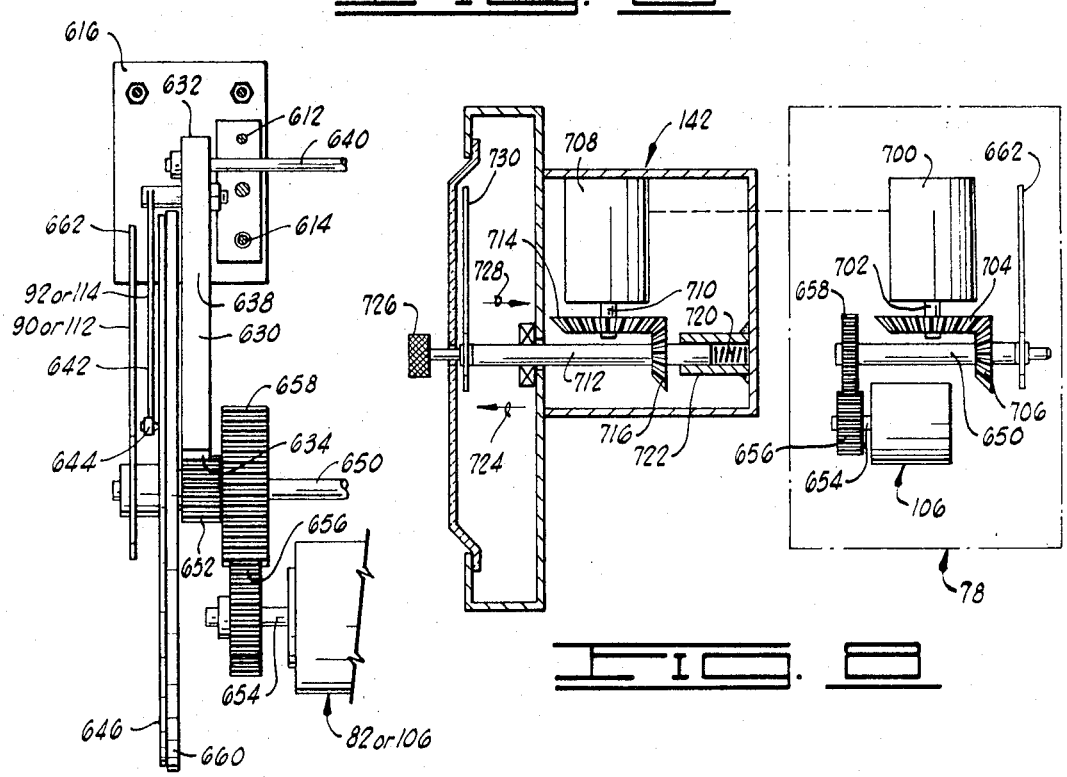

DRILLING-FLUID CONTROL-MONITORING APPARATUS

BACKGROUND OF THE INVENTION

1. Field of the Invention

This invention relates generally to improvements in control-monitoring apparatus and, more particularly, but not by way of limitation, to a control-monitoring apparatus to indicate drilling-fluid parameters.

2. Description of the Prior Art

During various drilling operations, as particularly related to the drilling of an oil or a gas well, a drilling-fluid is commonly circulated and partially retained in the borehole for various reasons, as for example; to keep the gas pressure substantially sealed in the borehole, and to remove the drill-bit shavings from the borehole. During the startup of the drilling operations and during the drilling operations per se, it is important that the operator have available certain information relating to the flow of the drilling-fluid so that the operator will be in a position to quickly and intelligently make certain operational or procedural decisions relating to the drilling operation. For example, the amount of drilling-fluid initially pumped into the borehole, the level of the drilling-fluid in the fluid-pits, and the amount or, more particularly, the relative amount of the drilling-fluid being returned to the fluid-pits, constitute some of the drilling-fluid parameters needed by the operator.

The above-mentioned drilling-fluid parameters provide an indication to the operator of certain possible problems which may exist at various times during the drilling operation. For example: an increasingly high level of drilling-fluid in the fluid-pits may indicate a possible "blow-out", and thereby provide a basis for an operator's decision to increase the weight of the drilling-fluid being circulated into the borehole; a decreasingly low level of drilling-fluid may indicate a possible loss of drilling-fluid in a formation cavity, a condition commonly referred to in the art as "loss-circulation"; and a knowledge of the relative flow of drilling-fluid in the return flow line generally indicates to the operator such conditions as, for example, that the borehole has been filled with a sufficient amount of drilling-fluid to begin the drilling operations.

Various solutions have been attempted in the past to provide an operator with at least some of the drilling-fluid parameters or data mentioned above. However, as the drilling operations have become more complex and sophisticated, it has become increasingly important that the operator have available, in an immediate and useable form, the maximum drilling-fluid data which includes sufficient drilling-fluid parameters upon which the various operational decisions can be quickly and efficiently based. Due particularly to the size and complexity of the modern drilling-rigs and to the increasingly large number of auxiliary components being supported or utilized in cooperation with such drilling-rigs, it has also become important that certain drilling-fluid parameters be made available at various remote, rig-locations or at various remote control positions.

SUMMARY OF THE INVENTION

An object of the invention is to provide a control-monitoring apparatus to indicate drilling-fluid parmeters.

Another object of the invention is to provide a control-monitoring apparatus to indicate the level of drilling-fluid in the fluid-pits.

A further object of the invention is to provide a control-monitoring apparatus to indicate the total change of drilling-fluid level in the fluid-pits.

A still further object of the invention is to provide a control-monitoring apparatus to indicate the volume of drilling-fluid required to initially fill the borehole.

Another object of the invention is to provide a control-monitoring apparatus to indicate the flow of drilling-fluid in a return flow line from the borehole to the fluid-pits.

One other object of the invention is to provide a control-monitoring apparatus to provide the drilling-fluid parameters in a quick, efficient and immediately useable form.

Another object of the invention is to provide a control-monitoring apparatus to indicate a preset high and a preset low level of drilling-fluid in the fluid-pits.

A still further object of the invention is to provide a control-monitoring apparatus to indicate a preset high and a preset low flow of the drilling-fluid through the return flow line.

A yet further object of the invention is to provide a control-monitoring apparatus having a remote, drilling-fluid parameter indicator.

One other object of the invention is to provide a moisture-proof shaft seal.

A still further object of the invention is to provide a control-monitoring apparatus to indicate drilling-fluid parameters which is economical in construction and operation.

Other objects and advantages of the invention will be evident from the following detailed description when read in conjunction with the accompanying drawings which illustrate one embodiment of the invention.

BRIEF DESCRIPTION OF THE DRAWINGS

FIG. 1 is a schematic, diagrammatical view of a control-monitoring apparatus constructed in accordance with the present invention.

FIG. 2 is a partial sectional, partial diagrammatical view of a return flow indicator utilized in the control-monitoring apparatus of FIG. 1 to indicate the flow of drilling-fluid in the return flow pipeline.

FIG. 3 is a view of one end of the stationary member of the moisture-seal of FIG. 2, looking toward the return flow transducer housing.

FIG. 4 is a schematic view of a level indicating apparatus utilized in the control-monitoring apparatus of FIG. 1 to indicate the level of the drilling-fluid in the fluid-pits.

FIG. 5 is a schematic view showing the electrical interconnection between some of the control components of the control-monitoring apparatus of FIG. 1.

FIG. 6 is an elevational view showing some of the control components of the control-monitoring apparatus of FIG. 1.

FIG. 7 is a side elevational view showing some of the control components of the control-monitoring apparatus of FIG. 1.

FIG. 8 is a partial sectional, partial diagrammatical view showing the remote drilling-fluid indicator of the control-monitoring apparatus of FIG. 1.

DESCRIPTION OF THE PREFERRED EMBODIMENT

Referring to the drawings in general and to FIG. 1 in particular, shown therein and designated by the general reference numeral 10 is a control-monitoring apparatus adapted to cooperate in a drilling-fluid circulation system to provide an instantaneous and a continuous indication of various drilling-fluid parameters, in a manner to be described in more detail below. The construction and operation of the control-monitoring apparatus 10 will initially be described with respect to the general overall operation thereof, as diagrammatically shown in FIG. 1, and the construction and operation of the preferred embodiment of the various control components will then be described in greater detail below.

The drilling-fluid circulation system, diagrammatically shown in FIG. 1, includes a plurality of fluid-pits 12, each fluid-pit 12 being sized to storingly retain a predetermined volume of drilling-fluid, and being interconnected by pipelines 14. Although three fluid-pits 12 are shown in FIG. 1, it is well known in the art that the exact number of fluid-pits 12 utilized in a particular drilling operation will depend to some extent upon the quantity of drilling-fluid utilized and the economical size of each particular fluid-pit 12.

A pair of pumps 16 and 17 are connected in parallel by a pair of flow pipelines 18 and 20, and the suction side of each pump 16 and 17 is connected to one of the fluid-pits 12 via a flow pipeline 22. The discharge side of each pump 16 and 17 is connected to a flow pipeline 24 via a pair of flow pipelines 26 and 28. The flow pipeline 24 is connected to a borehole, diagrammatically shown in FIG. 1 and designated therein by the general reference 30.

The pump 16 is driven by a pump drive 32 and the pump 17 is driven by a pump drive 34, as diagrammatically shown in FIG. 1. The pumps 16 and 17 and the pump drives 32 and 34 are sized and connected to move or pump some of the drilling-fluid from the fluid-pit 12 in fluidic communication therewith via the flow pipeline 22 into a portion of the borehole 30 via the flow pipeline 24, during one portion of the overall drilling operation. Some of the drilling-fluid is returned from the borehole 30 to the fluid-pits 12 via a return flow pipeline 36, during certain portions of the overall drilling operation, as will be made more apparent below.

Although only two pumps 16 and 17 are shown in FIG. 1, it will be apparent from the foregoing to those skilled in the art that additional pumps may be utilized or, in another form, only one of the pumps 16 or 17 may be utilized in a particular drilling-fluid circulation system. The sizing, the interconnection and the various control valves used in cooperation with the pumps 16 and 17 are well known in the art and a detailed description thereof is not required herein.

As shown in FIG. 1, a level indicating apparatus 38 is connected to each fluid-pit 12. Each level indicating apparatus 38 is constructed and adapted to sense the level of the drilling-fluid in one of the fluid-pits 12, and to provide an output level-signal indicative of the drilling-fluid level thus sensed. More particularly, each level indicating apparatus 38 is connected in series via a pair of conduits 40 and 42 to provide a common output via a pair of conduits 44 and 46. Each level indicating apparatus 38 is thus interconnected such that the output conduits 44 and 46 provide a total output level-signal 48, which is indicative of the drilling-fluid level in the fluid-pits 12.

Each level indicating apparatus 38, as shown in FIG. 1, includes a float 50 disposed in the drilling-fluid in one of the fluid-pits 12, and a transducer 52. Each transducer 52 is connected to one of the floats 50, and is adapted to cooperate therewith to translate the mechanical movement of the interconnected float 50 into an appropriate output signal to provide the output level-signal 48, in a manner to be described in greater detail below.

It should be particularly noted that specific embodiments of the control components of the control-monitoring apparatus 10 may be mechanically, electrically, pneumatically, hydraulically or fluidically operated and, therefore, the term "signal" as used above and below, refers more generally to a control output produced by either type of control component. A preferred embodiment of some of the control components will be described in greater detail below and, in those instances, the particular control signal will be more specifically identified.

As diagrammatically shown in FIG. 1, a return flow indicator 56 is disposed in a portion of the return flow pipeline 36. The return flow indicator 56 is constructed and adapted to responsively indicate the relative flow of the drilling-fluid through the return flow pipeline, and to provide an output return flow-signal indicative of the sensed flow of drilling-fluid, in a manner as to be described in greater detail below.

More particularly, the return flow indicator 56 includes a paddle 58 which is disposed in a portion of the return flow pipeline 36, and a return flow transducer 60 which is connected to the paddle 58. The return flow transducer 60 is constructed and adapted to translate the mechanical movement of the paddle 58 into an output return flow-signal 62 which is indicative of the flow of drilling-fluid through the return flow pipeline 36.

The control-monitoring apparatus 10 also includes a pair of pump transducers 64 and 66. As shown in FIG. 1, the pump transducer 64 is connected to the pump 16 and is adapted to cooperate therewith to provide an output flow-signal 70 indicative of the volume of drilling-fluid being moved through the pump 16. The pump transducer 66 is connected to the pump 17, and is adapted to cooperate therewith to provide an output flow-signal 72 which is indicative of the volume of drilling-fluid being moved through the pump 17.

The control-monitoring apparatus 10 includes a drilling-fluid indication apparatus, diagrammatically shown in FIG. 1 and designated therein by the general reference numeral 74. The drilling-fluid indication apparatus 74 is adapted to cooperate with the other components of the control-monitoring apparatus 10 and, more particularly, to provide various output indication signals, each indication signal being indicative of a particular drilling-fluid parameter, in a manner to be described in detail below.

The drilling-fluid indication apparatus 74 includes: a first recorder 76 which is constructed and adapted to provide output indication signals indicative of the drilling-fluid level in the fluid-pits 12, and a second recorder 78 which is constructed and adapted to provide output indication signals indicative of the flow of the drilling-fluid in the return flow pipeline 36, and a flow register apparatus 80 which is constructed and adapted to provide an output indication signal, indicative of the volume of drilling-fluid being moved through the pumps 16 and 17. In a preferred form, the drilling-fluid indication apparatus 74 is contained in a single control cabinet and disposed generally near the drilling operations, in a position where the various output indications are readily observable by the operator, for reasons which will become more apparent below.

As shown in FIG. 1, the first recorder 76 includes, a first recorder drive 82 which is adapted to receive the output level-signal 48 from the level indicating apparatus 38, and to provide an output drive-signal 84 in response to the output level-signal 48. The output drive-signal 84 of the first recorder drive 82 is connected to a pit indicating apparatus 86 and, more particularly, to the input of an instantaneous pit indicator 90 and to the input of a continuous pit indicator 92.

The instantaneous pit indicator 90 is constructed and adapted to receive the output drive-signal 84 of the first recorder drive 82, and to provide an output level indication-signal 94 which is indicative of the drilling-fluid level in the fluid-pits 12 at a particular instant of time. The continuous pit indicator 92 is, more particularly, adapted to receive the output drive-signal 84 of the first recorder drive 82, and to provide an output level indication-signal 96 which is indicative of the drilling fluid-level in the fluid-pits 12 over a predetermined period of time.

The output drive-signal 84 of the first recorder drive 82 is also connected to the input of a high-low pit actuator 98, as shown in FIG. 1. The high-low pit actuator 98 is constructed and adapted to receive the output drive-signal 84, and to provide an output high-signal 100 when the output drive-signal 84 reaches a preset high level, and to provide an output low-signal 102 when the output drive-signal 84 reaches a preset low level. The high-low pit actuator 98 is thus adapted to indicate a predetermined high and a predetermined low drilling-fluid level-change in the fluid-pits 12 via the output high-signal 100 and the output low-signal 102.

As shown in FIG. 1, the second recorder 78 includes a second recorder drive 106 which is adapted to receive the output return flow-signal 62 from the return flow transducer 60, and to provide an output drive-signal 108 in response to the return flow-signal 62. The output drive-signal 108 of the second recorder drive 106 is connected to the input of a return flow indicating apparatus 110 and, more particularly, to the input of an instantaneous flow indicator 112 and to the input of a continuous flow indicator 114.

The instantaneous flow indicator 112 is constructed and adapted to receive the output drive-signal 108 of the second recorder drive 106 and to provide an output flow indication-signal 116 which is indicative of the flow of drilling-fluid in the return flow pipeline 36 at a particular instant of time. The continuous flow indicator 114 is, more particularly, adapted to receive the output drive-signal 108 of the second recorder drive 106, and to provide an output flow indication-signal 118 which is indicative of the flow of drilling-fluid through the return flow pipeline 36 over a predetermined period of time.

The output drive-signal 108 of the second recorder drive 106 is also connected to the input of a high-low flow actuator 120, as shown in FIG. 1. The high-low flow actuator 120 is constructed and adapted to receive the output drive-signal 108, and to provide an output high-signal 122 when the output drive-signal 108 reaches a preset high level, and to provide an output low-signal 124 when the output drive-signal 108 reaches a preset low level.

The high-low flow actuator 120 is thus adapted to indicate a predetermined high and a predetermined low level of drilling-fluid flow in the return flow pipeline 36 via the output high-signal 122 and the output low-signal 124.

The flow register apparatus 80 of the drilling-fluid control indication apparatus 74 includes a continuity actuator 130 which is constructed and adapted to receive the output flow-signals 70 and 72 from the pump transducers 64 and 66. The continuity actuator 130 has an actuated position and a deactuated position and is, more particularly, constructed to provide continuity between the pump transducer 64 and a flow register 132, and to provide continuity between the pump transducer 66 and a flow register 134 in an actuated position of the continuity actuator 130. As indicated in FIG. 1, in an actuated position of the continuity actuator 130, the output flow-signal 70 is connected to the input of the flow register 132 and the output flow-signal 72 is connected to the input of the flow register 134.

The continuity actuator 130 is constructed such that the continuity actuator 130 will remain in the actuated position until the borehole 30 has been sufficiently filled with drilling-fluid. The continuity actuator 130 is then deactuated automatically so that the flow registers 132 and 134 indicate only the drilling-fluid required to initially fill the borehole 30, for reasons to be made more apparent below.

The flow register 132 is constructed and adapted to receive the output flow-signal 70 and to provide an output volume indication signal 136, indicative of the volume of drilling-fluid being moved through the pump 16. The flow register 134 is constructed and adapted to receive the output flow signal 72 and to provide an output volume indication signal 138, indicative of the volume of drilling-fluid being moved through the pump 17.

A power supply 140 is connected to the drilling-fluid control indication apparatus 74, to provide the operating power for the various control components therein, as shown in FIG. 1.

The control-monitoring apparatus 10 also includes, a remote pit level indicator 142, as shown in FIG. 1. The output drive-signal 84 from the first recorder drive 82 is connected to the remote pit level indicator 142, and the remote pit level indicator 142 is constructed and adapted to receive the drive-signal 84 and to provide an output level indication signal, indicative of the drilling-fluid level in the fluid-pits 12, at a remote position with respect to the drilling-fluid indication apparatus 74.

Operation of FIG. 1

The control-monitoring apparatus 10, as generally described above, provides an instantaneous indication of the level of the drilling-fluid in the fluid-pits 12 via an output level indication-signal 94, and simultaneously provides a continuous indication of the drilling-fluid level of the fluid-pits 12 via the output level indication-signal 96. A preset or predetermined high and low drilling-fluid level in the fluid-pits 12 is indicated via the output high-signal 100 and the output low-signal 102, respectively.

The control-monitoring apparatus 10 also provides an instantaneous indication of the flow of drilling-fluid in the return flow pipeline 36 via an output flow indication-signal 116, and simultaneously provides a continuous indication of the drilling-fluid flow in the return flow pipeline 36 via the output flow indication-signal 118. A preset or predetermined high and low drilling-fluid flow in the return flow pipeline 36 is indicated via the output high signal 122 and the output low-signal 124.

In addition to the above described drilling-fluid parameters, the control-monitoring apparatus 10 also provides an indication of the volume of drilling-fluid being moved to the borehole 30 via the pumps 16 and 17 via the flow indication signals 136 and 138.

It should be particularly noted that the output signals 94, 100, 102, 96, 116, 122, 124, 118, 136 and 138 of the drilling-fluid indication apparatus 74 are perceivable by the operator, as will be made more apparent below, and provide the operator with the necessary drilling-fluid parameter data required at the various stages of the overall drilling operation. In some instances, the signals, mentioned above, may provide a visual or an audible indication or, in certain instances, both a visual and an audible indication are provided. A preferred embodiment of the various control component apparatus and the particular signal produced thereby will be described in greater detail below.

During the drilling operation, either the pump 16 or 17, or both pumps 16 and 17 are pumping a predetermined volume of drilling-fluid from the fluid-pits 12 into the borehole 30.

The drilling-fluid is then recirculated back to the fluid-pits 12 via the return flow pipeline 36.

The first recorder 76 and the second recorder 78 are operating to controllingly monitor the drilling-fluid level in the fluid-pits 12 and flow of drilling-fluid through the return flow pipeline 36. The continuity actuator 130 is deactuated, thereby interrupting continuity between the pump transducers 64 and 66 and the flow registers 132 and 134. Depending upon such factors as, for example, the size of the rig and the location of the drilling-fluid indication apparatus 74, the operator may also have the remote pit level indicator 142 operably connected to the first recorder drive 82, thereby providing an indication of the level of drilling-fluid in the fluid-pits 12 at a remote location.

When it becomes necessary to stop the drilling operation, for example, to change a drill-bit, the level of the drilling-fluid will be, for the most part, lowered in the borehole 30 as the drilling pipe is removed from the borehole 30. Thus, to maintain head pressure on the formations down the hole, it is necessary to fill the borehole 30 with the drilling-fluid.

During the filling of the borehole 30, the drilling-fluid parameters indicating the volume of drilling-fluid that was required to fill the borehole 30, and an indication that the borehole 30 is filled with drilling-fluid are required. The continuity actuator 130 is moved or positioned in the actuated position, thereby establishing continuity between the pump transducers 64 and 66 and the flow registers 132 and 134, respectively. The output flow indication-signal 116 of the instantaneous flow indicator 112 will indicate a "zero" or a "no" flow of drilling-fluid through the return flow pipeline 36 via the output flow indication-signal 116.

In this position of the drilling-fluid indication apparatus 10, the pump drives 32 and 34 are started, and the pumps 16 and 17 will begin to fill the borehole 30 with drilling-fluid from the fluid-pits 12. The pump transducer 64 and the flow register 132 are connected via the continuity actuator 130, and the output volume indication-signal 136 of the flow register 132 indicates the volume of drilling-fluid being pumped through the pump 16. The pump transducer 66 and the flow register 134 are connected via the continuity actuator 130, and the output volume indication-signal 138 of the flow register 134 indicates the volume of drilling-fluid being pumped through the pump 17.

In a preferred form, the pumps 16 and 17 are, more particularly, reciprocating pumps, having a known volume of fluid pumped per stroke. In this instance, the pump transducers 64 and 66 are constructed to count the number of strokes of the pump 16 or 17, respectively, and the output signals 70 and 72, more particularly, indicate the number of strokes of the pump 16 or 17. The flow registers 132 and 134 register the total number of strokes of the pump 16 or 17, respectively, during the period of time the continuity actuator 130 is in an actuated position. In one form, for example, the pump transducers 64 and 66 are constructed to close a switch at the end of each pump stroke, and the pump register 132 and 134 thus provides an output numerical indication of the total number of pump strokes via the output signals 136 and 138. Pump transducers and registers of the type generally described above are well known in the art and a detailed description of construction and operation thereof is not required herein.

When the borehole 30 is filled with drilling-fluid, the continuity actuator 130 is deactuated, thereby interrupting the continuity between the pump trInsducers 64 and 66 and the flow registers 132 and 134, respectively. The output volume indication signals 136 and 138 thus indicate to the operator the total volume of drilling-fluid required to fill the borehole 30.

In a preferred form, the instantaneous flow indicator 112 and, more particularly, the output flow indication-signal 116 therefrom, is a dial-indicator. In this embodiment, which will be described in greater detail below, a switch is interposed in the continuity actuator 130, the switch being in the open position when the dial-indicator indicates a zero or no flow of drilling-fluid in the return flow pipeline 36. When the dial-indicator is moved off of the zero position by the drive-signal 108, thereby indicating a flow of drilling-fluid in the return flow pipeline 130, the switch is closed. In the closed position of the switch, the continuity actuator 130 is deactuated.

After the borehole 30 has been initially filled with drilling-fluid, the drilling operations can again be resumed. The control-monitoring apparatus 10 and particularly the drilling-fluid parameter indication apparatus 74 being specifically adapted to provide the necessary drilling-fluid parameters during the drilling operation when the drilling-fluid is being circulated through the borehole 30 and during the period when the borehole 30 is being initially filled with the drilling-fluid.

Embodiment of FIGS. 2 and 3

Shown in FIGS. 2 and 3 is a preferred embodiment of a return flow indicator 56 to be utilized in the control-monitoring apparatus 10, generally described above. As shown in FIG. 2, the return flow indicator 56 includes: a paddle 58, having opposite end portions 200 and 202, which is disposed in a lower portion of the return flow pipeline 36 (shown in dashed-lines in FIG. 2), such that a portion thereof is in contact with a portion of the drilling-fluid flowing through the return flow line 36. Thus, any drilling-fluid which is flowing in the return flow pipeline 36 will contact a portion of the paddle 58, thereby moving the paddle 58 in a manner to be described in more detail below.

The paddle 58, generally near the end 200 thereof, is secured to a paddle shaft 204 by an interconnecting flange 206, as shown in FIG. 2. The paddle shaft 204 has opposite end portions 208 and 210, and is sized such that a portion thereof rotatingly extends through a shaft aperture 212 in a return flow transducer housing 214. The return flow transducer housing 214, as shown in FIG. 2 is constructed to rotatingly receive a portion of the paddle shaft 204, and to provide a moisture-proof container for the paddle shaft 204 bearing supports (not shown) and the return flow transducer 60, both of which are disposed and supported in a portion of the return flow transducer housing 214.

As indicated in FIG. 2, the paddle shaft 204, generally adjacent the end 210 thereof, is connected to the return flow transducer 60. The return flow transducer 60 is constructed and adapted to translate the mechanical, rotational movement of the paddle shaft 204 and to provide the output return flow-signal 62 proportional thereto.

From the foregoing, it will be apparent to those skilled in the art that drilling-fluid flowing through the return flow pipeline 36 will cause the paddle 58 to move, generally in the direction of the drilling-fluid flow, about the interconnection of the paddle 58 and the paddle shaft 204, and the movement of the paddle 58 will thereby cause an incremental rotational movement of the paddle shaft 204. Thus the rotation of the paddle shaft 204 and consequently the output return flow-signal 62 is proportional or indicative of the relative flow of drilling-fluid through the return flow pipeline 36, rather than being a volumetric indication. Transducers adapted to receive rotational shaft movements and to translate such a mechanical movement into an output signal porportional thereto, such as described above with respect to the return flow transducer 60, are well known in the art and a detailed description of the construction and operation thereof is not required herein.

A moisture-seal 214 is connected to the return flow transducer housing 214 and to the paddle shaft 204. The moisture-seal 214 is constructed and adapted to provide a substantially moisture-tight seal between the paddle shaft 204 and the return flow transducer housing 214, in a manner to be made more apparent below.

The moisture-seal 214 includes a hollow stationary member 216 having an outer periphery 218. The stationary member 216 is sealingly secured on one end thereof to the return flow transducer housing 214 generally about the shaft aperture 212, as shown in FIG. 2. The stationary member 216 is sized and positioned to encompass the shaft aperture 212 and to encompass a portion of the paddle shaft 204, such that the paddle shaft 204 is freely rotatable in the hollow portion of the stationary member 216.

As shown in FIGS. 2 and 3, a lip portion 220 is formed on the end of the stationary member 216, opposite the end thereof which is secured to the return flow transducer housing 214. The lip portion 220 extends a distance generally radially from the stationary member 216 about the entire outer periphery 218 thereof.

The moisture-seal 214 also includes a hollow rotating member 222, having an inner periphery 224 and an outer periphery 226. As shown more clearly in FIG. 2, one end of the rotating member 222 is secured to a portion of the paddle shaft 204 via a flange portion 228 which extends radially about the outer periphery 226 of the rotating member 222. The rotating member 222 and particularly the inner periphery 224 thereof is sized to extend a distance axially over the uppermost end portion of the lip 220 of the stationary member 216, as shown in FIG. 2, thereby leaving a clearance between the rotating member 222 and the outer periphery of the lip portion 220 of the stationary member 216, for reasons which will be made apparent below.

Operation of FIGS. 2 and 3

The return flow indicator 56 senses the relative flow of drilling-fluid in the return flow pipeline 36 and provides the output return flow-signal 62, proportional thereto. More particularly, the output return flow-signal 62 is proportional to the incremental rotation of the paddle shaft 204 resulting from the drilling-fluid in the return flow pipeline 36 contacting the paddle 58.

The moisture-seal 214 is constructed to cooperate with the rotating paddle shaft 204 and a portion of the return flow transducer housing 214 to prevent moisture from entering the return flow transducer housing 214 via the shaft aperture 212, thereby damaging the various operating and control components therein. Since the rotating member 222 is secured about the paddle shaft 204, as shown in FIG. 2, moisture is prevented from entering the transducer housing 214 along the paddle shaft 204 via the interconnection between the rotating member 222 and the paddle shaft 204. Further, since the stationary member 216 is secured about the outer periphery 218 thereof to the return flow transducer housing 214, moisture is prevented from entering the return flow transducer housing 214 via the connection between the stationary member 216 and the return flow transducer housing 214.

The lip 220 of the stationary member 216 cooperates with the overhanging portion of the rotating member 222 to prevent moisture from entering into the hollow portion, generally defined by the inner periphery 224, of the rotating member 222. Thus, moisture is directed onto the outer periphery 218 of the stationary member 216 and discharged from the lower portion thereof. In other words, moisture is guided by the overhanging portion of the rotating member 222 and the lip 220 generally about the outer periphery 218 of the stationary member 216 and thus the moisture is prevented from contacting the portion of the paddle shaft 204 disposed in the hollow portions of the rotating member 222 or the stationary member 216.

The moisture-seal 214 thus prevents moisture from entering the return flow transducer housing 214 along the paddle shaft 204. Since the moisture-seal 214 has no contacting or wearing components, the moisture-proofing of the return flow transducer housing 214 is provided in a manner requiring less field maintenance, and in a manner assuring an operable, moisture-proof seal over a relatively long period of operating time.

Embodiment of FIG. 4

Shown in FIG. 4 is a preferred embodiment of a portion of the level indicating apparatus 38 to be utilized in the control-monitoring apparatus 10, described generally before. As shown in FIG. 4, each level indicating apparatus 38 comprises a variable resistor apparatus 302, which includes a resistor 304 and a positionable contacting arm 306.

In this embodiment of the level indicating apparatus 38, as shown in FIG. 4, each contact arm 306 is connected to one of the floats 50, in such a manner that as the float 50 is moved from a preset position by changes in the drilling-fluid level in the fluid-pits 12, the mechanical movement of the float 50 alters the contacting position between the interconnected contact arm 306 and the cooperating resistor 304. As indicated in FIG. 4, the resistors 304 are connected in series, and thus the total electrical resistance in the conduits 44 and 46 is controllingly varied in response to changes in the drilling-fluid level in the fluid-pits 12.

The level indicating apparatus, as shown in FIG. 4, also includes, a calibrating resistor 310, having a manually adjustable contact arm 312 cooperating with a resistor 314, in a manner similar to that described before with respect to the contacting arm 306 and the resistors 304. The calibrating variable resistor 310 is interposed in the conduit 44 so that the pit indicating apparatus may be initially calibrated to a preset point or, more particularly, so that the total resistance in the conduits 44 and 46 may be initially calibrated to a preset level at the commencement of the drilling operations.

Each variable resistor apparatus 302 and the calibrating variable resistor apparatus 310 are connected to the first recorder drive 82, as indicated in FIGS. 1 and 4, and thus the output drive-signal 84 of the first recorder drive 82 will vary in response to the total change of resistance in the conduits 44 and 46 or, in other words, to the output level indication signal 48. In a preferred form, the first recorder drive 82 is an electric motor, and the output level indication signal 48 would, in that instance, be connected in the motor control circuit such that the electric motor is drivingly operated in response to a change of resistance in the conduits 44 and 46 or, in other words, in response to the output level indication signal 48.

It will be apparent from the foregoing to those skilled in the art, that the output level-signal 48 is more particularly indicative of a total level-change in the volume of drilling-fluid retained in the fluid-pits 12. Thus the output level-signal 48 is indicative of a change of drilling-fluid volume, rather than being indicative of a total drilling fluid volume per se.

Operation of FIG. 4

Each level indicating apparatus 38, as described above, cooperates to provide the output level-signal 48, which is indicative of the total drilling-fluid, level-change in the fluid-pits 12. After each fluid-pit 12 has been initially filled with a predetermined volume of drilling-fluid, the output level-signal 48 is adjustingly set to a predetermined position via the calibrating variable resistor apparatus 310.

The output drive-signal 84 of the first recorder 76 is thus responsive to the total change of drilling-fluid level in the fluid-pits 12. It has been found that the total change of drilling-fluid level in the fluid-pits 12 is more indicative of certain conditions in the overall drilling operation, and does constitute an important drilling-fluid parameter to be considered by the operator.

Embodiment of FIG. 5

Shown in detail in FIG. 5, is a preferred embodiment of the electrical interconnection between the pump transducers 64 and 66 and the flow registers 132 and 134; and the electrical interconnection between the high-low pit actuator 98 and the high-low flow actuator 120 and the respective output indicating apparatus cooperating with each high-low actuator 98 and 120 to provide an output high or an output low visual and audible indication.

As shown in FIG. 5, and for reasons which will become more apparent below, the high-low flow actuator 120 is schematically shown as a pair of normally opened switches 400 and 402, the switch 400 being referred to below as the low-switch 400 and the switch 402 being referred to below as the high-switch 402. The high-low pit actuator 98 is also schematically shown in FIG. 5 as a pair of normally opened switches 404 and 406, the switch 404 being referred to below as the low-switch 404 and the switch 406 being referred to below as the high-switch 406.

The high-low flow actuator 120 is constructed such that when the output drive-signal 108 of the second recorder drive 106 reaches a preset high or a preset low level, the low-switch 400 or the high-switch 402, respectively, is closed, thereby indicating a low or a high level of drilling-fluid flow through the return flow pipeline 36. The high-low pit actuator 98 is constructed such that when the output drive-signal 84 of the first recorder drive 82 reaches a preset high or a preset low level, the low-switch 404, or the high-switch 406, respectively, is closed, thereby indicating a low or a high level-change of drilling-fluid in the fluid-pits 12.

The pump transducers 64 and 66 are schematically shown in FIG. 5, as a normally opened switch 408 and 410, respectively. The pump transducers 64 and 66 are, more particularly, adapted to cooperate with a reciprocating pump, as mentioned before, and in this instance, the total number of times the switch 408 or 410 is closed during a particular operating cycle of the control-monitoring apparatus 10 will be indicative of the volume of fluid being moved from the fluid-pits 12 to the borehole 30 via the pumps 16 or 17, respectively.

As shown in FIG. 5, the operating power is provided by the power supply 140 via a pair of power conductors 412 and 414. A main power switch 416 is interposed in the power conductor 412, and in the opened position of the power switch 416, as shown in FIG. 5, the power supply 140 is disconnected from the various control components shown in FIG. 5. An overload fuse 418 is interposed in the power conductor 414, and the fuse 418 is adapted to protect the control components from an excessive or overload current, in a manner well known in the art.

As shown in FIG. 5, it has been assumed that the power supply 140 is of the alternating current type, and further, that various control components are operated or require a direct current type of power supply. The power supply 140 is therefore coupled to the various operating components via a transformer 430, and a rectifying circuit having a pair of diodes 422 and 424 connected in parallel and a filter capacitor 426. The diodes 422 and 424 and the filter capacitor 426 cooperate to provide a DC power source via the control power conductors 428 and 430 to the various control components, in a manner well known in the art and requiring no further detailed description herein.

As shown in FIG. 5, a low pit indicator lamp 432 is connected on one side thereof to the control power conductor 428 and on the opposite side thereof to the low-switch 404 of the high-low pit actuator 98 via a conductor 434. A high pit indicator lamp 436 is connected on one side thereof to the control power conductor 428 and on the opposite side thereof to the high-switch 406 of the high-low pit actuator 98 via a conductor 438. The pit indicator lamps 432 and 436 are adatped and connected to provide a visual output indication when the low-switch 404 or the high-switch 406 is closed, in a manner to be described more fully below.

As shown in FIG. 5, a low flow indicator lamp 440 is connected on one side thereof to the control power conductor 428 and on the opposite side thereof to the low-switch 400 of the high-low flow actuator 120 via a conductor 442. A high flow indicator lamp 444 is connected on one side thereof to the control power conductor 428 and on the opposite side thereof to the high-switch 402 of the high-low flow actuator 120 via a conductor 446. The flow indicator lamps 440 and 444 are adapted and connected to provide a visual output indication when the low-switch 400 or the high-switch 402 is closed, in a manner to be described in more detail below.

The side of the indicator lamp 432 which is connected to the low-switch 404 is also connected to one side of a transistor oscillator 447 via a conductor 450. The side of the indicator lamp 436 which is connected to the high-switch 406, is also connected to the oscillator 447 via a conductor 452 which, as shown in FIG. 5, is connected to the conductor 450.

As shown in FIG. 5, a normally-opened, double-pole, single-throw switch 454 is interposed in the conductors 452 and 450 generally between the indicator lamps 432 and 436, respectively, and the oscillator 447. More particularly, one set of contacts of the switch 454 is interposed in the conductor 452 and the other set of contacts of the switch 454 is interposed in the conductor 450.

The side of the indicator lamp 440 which is connected to the low-switch 400 is connected to the conductor 450 via a conductor 455. The side of the indicator lamp 444 which is connected to the high-switch 402 is connected to the conductor 450 via a conductor 456. Thus, the conductors 455 and 456 are each connected to one side of the oscillator 447 via the conductor 450.

As shown in FIG. 5, a normally-opened, double-pole, single-throw switch 458 is interposed in the conductors 455 and 456 generally between the indicator lamps 440 and 444, respectively, and the oscillator 447. More particularly, one set of contacts of the switch 458 is interposed in the conductor 455 and the other set of contacts of the switch 458 is interposed in the conductor 456.

The oscillator 447, as shown in FIG. 5, is also connected to the control power conductor 428, and to a speaker 448. The oscillator 447 is constructed to establish a tone by oscillating at a predetermined frequency when the oscillator 447 is connected to the control power conductors 428 and 430. The speaker 448 is constructed to receive the tone produced by the oscillator 447 and to provide an audible indication in the closed position of either the low-switch 400, the high-switch 402, the low-switch 404 or the high-switch 406. A diode 459 is interposed in each conductor 450, 452, 455 and 456, generally between the switches 454 and 458 and the oscillator 447, as shown in FIG. 5.

As shown in FIG. 5, one contact of each switch 400 and 402 of the high-low flow actuator 120 is connected to the control power conductor 430 via a conductor 460. Also, one of the contacts of each switch 404 and 406 of the high-low pit actuator 98 is connected to the control power conductor 430 via a conductor 462.

From the foregoing and from FIG. 5, it will be apparent to those skilled in the art, that in the opened position of the switches 400, 402, 404 and 406, electrical continuity between the control power conductors 428 and 430 and the indicator lamps 432, 436, 440 and 444 is interrupted, and the indicator lamps 432, 436, 440 and 444 are thus de-energized. It also follows from the foregoing, that when the double-pole, single-throw switches 454 and 458 are in the opened position, as shown in FIG. 5, electrical continuity between the control power conductors 428 and 430 and oscillator 447 is thereby interrupted, and thus the oscillator 447 is in the de-energized position. However, it should also be noted that, even in the closed position of the switches 454 and 458, the electrical continuity between the oscillator 447 and the control power conductors 428 and 430 is interrupted when the switches 400, 402, 404 and 406 are in the opened position, for reasons which will be made more apparent below.

The continuity actuator 130, as shown in FIG. 5, includes a pair of momentary, push-button actuators 464 and 466. The momentary actuator 464 has a set of cooperating open contacts 468 and, as indicated in FIG. 5, the momentary actuator 464 is constructed such that in the closed position thereof, the momentary actuator 464 bridges the cooperating contacts 468, thereby establishing electrical continuity thereacross. The momentary actuator 466 has a set of cooperating open contacts 470 and, as indicated in FIG. 5, the momentary actuator 466 is constructed such that in the closed position thereof, the momentary actuator 466 bridges the cooperating contacts 470, thereby establishing electrical continuity thereacross associated therewith.

The continuity actuator 130 also includes a holding coil relay 472, having a relay coil 474, a set of cooperating contacts 476 and 478 and a relay switch arm 480. The holding coil relay 472 is shown in FIG. 5 in the de-energized position thereof and, in that position, the relay switch arm 480 is in contacting engagement with the relay contact 478, thereby establishing electrical continuity therebetween.

The continuity actuator 130 also includes a relay 482 and a relay 484. The relays 482 and 484 are connected to the switches 408 and 410 of the pump transducers 64 and 66, respectively and adapted to cooperate with the holding coil relay 472 to establish electrical continuity between the switch 408 and the flow register 132 and between the switch 410 and the flow register 134, in one position of the relays 472, 482 and 484, as will be described in greater detail below.

The relay 482 includes, a relay coil 486 and a double set of cooperating contacts, one set of contacts being designated in FIG. 5 by the reference numerals 488 and 490, and the other set of contacts being designated in FIG. 5 by the reference numerals 492 and 494. A relay switch arm 496 cooperates with the relay contacts 488 and 490, and a relay switch arm 498 cooperates with the relay contacts 492 and 494. As shown in FIG. 5, the relay switch arms 496 and 498 are in the de-energized position of the relay 482 and, in that position, the relay switch arm 496 is in contacting engagement with the relay contact 490, and the relay switch arm 498 is in contacting engagement with the relay contact 494.

The relay 484 includes, a relay coil 500 and a double set of cooperating contacts, one set of contacts being designated in FIG. 5 by the reference numerals 502 and 504, and the other set of contacts being designated in FIG. 5 by the reference numerals 506 and 508. A relay switch arm 510 cooperates with the relay contacts 502 and 504, and a relay switch arm 512 cooperates with the relay contacts 506 and 508. As shown in FIG. 5, the relay switch arms 510 and 512 are in the de-energized position of the relay 484 and, in that position, the relay switch arm 510 is in contacting engagement with the contact 504, and the relay switch arm 512 is in contacting engagement with the relay contact 508.

The control circuitry, as shown in FIG. 5, also includes a fill-drill toggle switch 513 and a zero-flow switch 514, both of which are shown in FIG. 5 in the opened position thereof. A flow indicator lamp 515 is also connected in the continuity actuator 130, in a manner and for reasons which will be described in greater detail below.

As shown in FIG. 5, the power conductor 430 is connected to one side of the switch 408 via a conductor 516, to one side of the switch 410 via a conductor 518, and to one side of the switch 514 via a conductor 520. The opposite side of the switch 408 is connected to the relay switch arm 498 via a conductor 522; the opposite side of the switch 410 is connected to the relay switch arm 512 via a conductor 524; and the opposite side of the switch 514 is connected to one side of the fill-drill switch 513 via a conductor 526.

The control power conductor 428 is connected to the flow register 134 via a pair of interconnected conductors 528 and 530. The flow register 134 is connected to the flow register 132 via a conductor 532 which is also connected to the conductor 528.

As shown in FIG. 5, the flow register 132 is connected to the relay contact 492 via a conductor 534, and the flow register 134 is connected to the relay contact 506 via a conductor 536.

The momentary actuator 464 and, more particularly, one of the contacts 468 thereof, is connected to the control power conductor 430 via a conductor 540 and a conductor 542. The other contact 468 of the momentary actuator 464 is connected to the relay contact 502 and to one side of the coil 500 of the relay 484 via a conductor 544.

The momentary actuator 466 and, more particularly, one of the contacts 470 thereof, is connected to the control power conductor 430 via a conductor 546 which is connected to the conductor 540. The other contact 470 of the momentary actuator 466 is connected to the relay contact 488 and to one side of the coil 486 of the relay 482 via a conductor 548.

The side of the coil 486, opposite the side thereof connected to the conductor 548, is connected to the relay contact 478 of the holding coil relay 472 by a conductor 550. As shown in FIG. 5, the side of the coil 500, opposite the side thereof connected to the conductor 544, is connected to the relay contact 478 of the holding coil relay 472 via a conductor 552 which is connected to the conductor 550.

The control power conductor 430 is connected to the relay switch arm 496 by a conductor 554 and a conductor 556, the conductor 556 being connected to the conductor 540. The control power conductor 430 is also connected to the relay switch arm 510 via a conductor 558 which is connected to the conductors 554 and 556. One side of the coil 474 of the holding coil relay 472 is connected to the flow indicator lamp 515 via a conductor 560, as shown in FIG. 5. The opposite side of the coil 474 is connected to the control power conductor 428 via a conductor 564 which is connected to the conductor 530 and the conductor 528, and connected to the relay switch arm 480 via a conductor 566.

As shown in FIG. 5, a flow switch 580 is interposed in the conductor 460, generally between the high-low flow actuator 120 and the connection between the conductors 430 and 460. The flow switch 580 is shown in FIG. 5 in the opened position thereof, and is adapted and positioned to provide an audible indication of drilling-fluid flow in the return flow pipeline 36, in a manner to be described in more detail below.

Operation of FIG. 5

The various control components are shown in FIG. 5 in the de-energized position, that is the position of the particular control component in a deactuated status or a status wherein power is not being supplied thereto via the control power conductors 428 and 430. When the main power switch 416 is moved to the closed position, operating power is provided to the control power conductors 428 and 430. In this initial position, the indicator lamps 432, 436, 440 and 444 are not lit, since the switches 400, 402, 404 and 406 are in the opened position, thereby interrupting the electrical continuity between the control power conductors 428 and 430 and the indicator lamps 432, 436, 440 and 444.

When a low drilling-fluid level-change is sensed by the highblow pit indicator 98, the low-switch 404 will be closed, thereby establishing electrical continuity between the control power conductors 428 and 430 and the low pit indicator lamp 432. The energizing or lighting of the indicator lamp 432 thus provides a perceptible, visual indication of high level-change of drilling-fluid in the fluid-pits 12. In the closed position of the low-switch 404, the oscillator 447 will not be energized or, in other words, will not produce an audible signal, since the switch 454 is in the opened position, thereby interrupting electrical continuity between the oscillator 447 and the control power conductors 428 and 430.

The closing of the high-switch 406 will energize or light the high-pit indicator lamp 436; the closing of the low-switch 400 will energize or light the low indicator lamp 440; and the closing of the high-switch 402 will energize or light the high indicator lamp 444, each indicator lamp 436, 440 and 444 being energized in a manner similar to that described in detail above with respect to the closing of the low-switch 404 and the energizing or lighting of the low indicator lamp 432. Neither the closing of the low-switch 400, the high-switch 402, nor the high-switch 406 will energize the oscillator 447 to produce an audible signal via the speaker 448, since the switches 454 and 458 are in the opened position.

It is apparent from the foregoing, that if the switch 454 is moved to the closed position, the closing of the low-switch 404 or the closing of the high-switch 406 will not only energize or light the low indicator lamp 432 or the high indicator lamp 436, respectively, but the closing of either switch 404 or 406 will also establish electrical continuity between the oscillator 447 and the control power conductors 428 and 430, thereby producing an audible signal via the speaker 448 indicating a relatively low or high change in the drilling-fluid level in the fluid-pits 12. After the switch 458 has been moved to the closed position, the closing of either the low-switch 400 or the high-switch 402 of the high-low flow indicator 120 will not only produce a visual indication of a relatively low or relatively high flow in the return flow pipeline 36, but the closing of either the low-switch 400 or the high-switch 402 will also establish electrical continuity between the oscillator 447 and the control power conductors 428 and 430, thereby producing an audible indication of a low or a high flow of drilling-fluid in the return flow pipeline 36, in a maner similar to that described before with respect to the low-switch 404, the high-switch 406 and the switch 454. From the foregoing, it is apparent that the audible indication signal produced from the speaker 448 is controllable by the operator either closing the switches 454 or 458, or leaving the switches 454 or 458 in the respective opened position thereof.

Before refilling the borehole 30 with drilling-fluid, the operator will establish electrical continuity between the pump transducers 64 and 66 and the flow registers 132 or 134, respectively, by actuating the continuity actuator 130. Since, during this portion or cycle of the overall drilling operation no drilling-fluid will be flowing through the return flow pipeline 36, the zero- or no-flow switch 514 will be in the open position. In a preferred form, as mentioned before, the no-flow switch 514 is actuated open by a dial-indicator which is positioned on the drilling-fluid indication apparatus 74 to indicate a zero flow of drilling-fluid. The fill-drill switch 513 is then moved to the closed position. Since the zero-flow switch 514 is in the open position, the relay 472 will remain in the de-energized position, as shown in FIG. 5.

In this position, electrical continuity between the flow register 132 and the pump transducer 64 is initially established by the depressing or moving of the momentary actuator 466 to the actuated position or, in other words, to a position wherein the momentary actuator 466 bridges the cooperating open contacts 470 thereof. The bridging of the open contacts 470 provides electrical continuity between the relay coil 486 of the relay 482 and the control power conductors 428 and 430 via the conductors 540, 546, 548, 550, 566, 564 and 528, thereby energizing the relay 482. In the energized position of the relay 482, the relay switch arm 496 will be moved into contacting engagement with the relay contact 488, and the relay switch arm 498 will be moved into contacting engagement with the relay contact 492. The moving of the relay switch arm 496 into contacting engagement with the relay contacts 488 cooperates with the holding coil relay 472 to maintain the relay 482 in the energized position after the momentary actuator 466 has been released, thereby opening the contacts 470 thereof.

In the energized position of the relay 482, the pump transducer 64 is in electrical continuity with the flow register 132 and the control power conductors 428 and 430. As mentioned before, the pump transducer 64 is constructed such that the number of times that the switch 408 is closed during a certain operating cycle is indicative of the volume of drilling-fluid flowing through the pump 16. From FIG. 5, it is apparent that when the switch 408 is in the closed position, the pump transducer 64 and the flow register 132 are in electrical continuity with the control power conductors 428 and 430, and the flow register 132 is adapted to register or indicate that the switch 408 or, more particularly, the number of times the switch 408 is in the closed position during a certain period of time.

If the pump 17 is also to be utilized to move or pump drilling-fluid into the borehole 30, it will be necessary to establish electrical continuity between the flow register 134 and the pump transducer 66 so that the flow of drilling-fluid through the pump 17 will also be registered. To establish such electrical continuity, the momentary actuator 464 is actuated or, in other words, moved to a position wherein the momentary actuator 464 bridges the cooperating open contacts 468 thereof. The bridging of the open contacts 468 provides electrical continuity between the relay coil 500 of the relay 484 and the control power conductors 428 and 430 via the conductors 540, 542, 544, 552, 550, 566, 564 and 528, thereby energizing the relay 484. In the energized position of the relay 484, the relay switch arm 510 will be moved into contacting engagement with the relay contact 502, and the relay switch arm 512 will be moved into contacting engagement with the relay contact 506. The moving of the relay switch arm 510 into contacting engagement with the relay contacts 502 cooperates with the holding coil relay 472 to maintain the relay 484 in the energized position after the momentary actuator 464 has been released, thereby opening the cooperating contacts 468. In the energized position of the relay 484, the pump transducer 66 is in electrical continuity with the flow register 134 and the control power conductors 428 and 430. Thus, when the switch 410 is in the closed position, the pump transducer 66 and the flow register 134 are in electrical continuity with the control power conductors 428 and 430, and the flow register 134 registers or indicates the total number of times the switch 410 is moved to the closed position during a certain operating period of time, in a manner similar to that described with respect to the switch 408 of the pump transducer 64.

When the drilling-fluid begins to flow through the return flow pipeline 36, the zero-flow switch 514 will be moved to the closed position, thereby establishing electrical continuity between the flow indicator lamp 515 and the control power conductors 428 and 430. The flow indicator lamp 515 is thus energized, and provides a visual indication that the drilling-fluid has begun to flow in the return flow pipeline.

The closing of the "zero" flow switch 514 also establishes the electrical continuity between the coil 474 and the control power conductors 428 and 430. The closing of the zero-flow switch 514, thus energizes the coil 474 of the holding coil relay 472, thereby moving the relay switch arm 480 therein to the energized position or, in other words, moving the relay switch arm 480 into contacting engagement with the open contact 476 of the holding coil relay 472.

The moving of the relay switch arm 480 to the energized position, in contacting engagement with the open contact 476, interrupts electrical continuity between the coils 486 and 500 of the relays 482 and 484, respectively. Thus, when the holding coil relay 472 is energized by the closing of the zero-flow switch 514, the relays 482 and 484 will be de-energized, thereby interrupting electrical continuity between the pump transducers 64 and 66 and the flow registers 132 or 134, respectively.

During the filling of the borehole 30 with drilling-fluid, as described above, if the operator also desires an audible indication that drilling-fluid has begun to flow in the return flow pipeline 36, the operator will initially close the switch 458. In other words, the switch 458 is closed prior to establishing electrical continuity between the pump transducers 64 and 66 and the flow registers 132 or 134, respectively, or at the beginning of the refilling operation. In a preferred form, the flow switch 580 is actuated open by a dial-indicator which is positioned on the drilling-fluid indication apparatus 74, in a manner similar to that described before with respect to the no-flow switch 514. Since there is no flow of drilling-fluid in the return flow pipeline 36 during the initial stages of the refilling operation, the flow switch 580 will be in the open position, and the low-switch 400 of the high-low flow actuator 120 will be in the closed position. When the drilling-fluid begins to flow through the return flow pipeline 36, the flow switch 580 will be closed, thereby establishing electrical continuity between control power conductors 428 and 430 and the oscillator 447 through the low-switch 400. In this position, the oscillator 447 will be energized, and an audible indication of the drilling-fluid flow in the return flow pipeline 36 will be provided via the speaker 448. The speaker 448 will continue to provide the audible indication until the flow in the return flow pipeline 36 is sufficient to deactuate or open the low-switch 400 of the high-low flow indicator 120, thereby interrupting the electrical continuity between the control power conductors 428 and 430 and the oscillator 447, or until the operator opens the switch 458.

It is apparent from the foregoing, that the output signals 100 and 102 of the high-low pit actuator 98, more particularly, refer to the visual indication provided by the pit indicator lamps 432 and 436 and, in some instances, to the audible signal provided by the speaker 448. By the same token, the output signals 122 and 124 of the high-low flow actuator 120, more particularly, refer to the visual indication provided by the flow indicator lamps 440 and 444 and, in some instances, to the audible signal provided by the speaker 448.

Embodiment of FIGS. 6 and 7

Shown in FIGS. 6 and 7 is a preferred embodiment of a high-low actuator 98 or 120, a recorder drive apparatus 82 or 106, an instantaneous indicator 90 or 112, and a continuous indicator 92 or 114, all of which are constructed and connected to be utilized in the control-monitoring apparatus 10 of FIG. 1, and more particularly in the drilling-fluid indication apparatus 74. The various control components shown in FIGS. 6 and 7 are constructed such that they can be utilized in either the first recorder 76 or the second recorder 78, as will be made more apparent below.

Referring more particularly to FIG. 6, the high-low actuator 98 or 120 is supported in the first recorder 76 or the second recorder 78, respectively, and is constructed and adapted to support the low-switch 400 or 404 and the high-switch 402 or 406 in an adjustingly, actuating position. The low-switch 400 or 404 is disposed on and secured to a carrier 600, having a pair of apertures 602 and 604 (shown in dashed-lines) extending therethrough. The aperture 604 is threaded, and the aperture 602 is sized to slidingly receive an elongated screw, in a manner and for reasons to be made more apparent below.

The high-switch 402 or 406 is disposed on and secured to a carrier 606, having a pair of apertures 608 and 610 (shown in dashed-lines) extending therethrough. The aperture 608 is threaded, and the aperture 610 is sized to slidingly receive an elongated screw, in a manner and for reasons to be made more apparent below.

A pair of elongated screws 612 and 614 are rotatingly supported in a portion of the recorder 76 or 78 by a pair of brackets 616 and 618. A guide shaft 620 is also supported by the brackets 616 and 618, the guide shaft 620 being sized to slidingly extend through a support aperture 622 formed through a central portion of each carrier 600 and 606, only the aperture 622 in the carrier 600 being shown in FIG. 6. The guide shaft 620, more particularly, provides guiding support for the carriers 600 and 606, during the adjustment of the high-low actuator 98 or 120, in a manner to be described in greater detail below.

As indicated in FIG. 6, the screw 612 is sized to slidingly extend through the sliding aperture 602 of the carrier 600 and to threadingly extend through the aperture 608 of the carrier 606. The aperture 602 in the carrier 600 is, more particularly, sized to have a larger diameter than the screw 612, for reasons to be made more apparent below.

The screw 614 is sized to extend through the aperture 604 of the carrier 600 and to slidingly extend through the aperture 610 of the carrier 606. The aperture 610 of the carrier 606 has a larger diameter than the screw 614, for reasons to be described in more detail below.

The high-low actuator 98 or 120 also includes a low adjusting knob 624 and a high adjusting knob 626. The low adjusting knob 624 is gearingly connected (not shown) to the elongated screw 614 in such a manner that by turning the low adjusting knob 624, the screw 614 is rotated. The high adjusting knob 626 is gearingly connected (not shown) to the screw 612 such that by turning the high adjusting knob 626, the screw 612 is turned or rotated.

Since the carrier 600 and, more particularly, the aperture 604 therein, threadingly engages the screw 614, and further, since the guide rod 620 supports the carrier 600 in a non-engaging relationship with the screw 612, when the screw 614 is turned by turning the low knob 624, the carrier 600 will be moved toward the support 616 or the support 618, depending upon the direction of rotation of the low knob 624, thereby adjusting the high actuating position of the low-switch 400 or 404, as will be made more apparent below. From the foregoing, it will be apparent that when the screw 612 is turned by turning the high knob 626, the carrier 600 will be moved toward the support 616 or the support 618, depending upon the direction of rotation of the high knob 626, thereby adjusting the low actuating position of the switch 402 or 406, as will be made more apparent below.

The low-switch 400 or 404 and the high-switch 402 or 406 are supported in the recorder 76 or 78 to cooperate with a control cam 630, the control cam 630 being shaped and positioned to actuate or close the low-switch 400 or 404 or the high-switch 402 or 406, in one position thereof. The control cam 630 has opposite end portions 632 and 634, and a low cam surface 636 and a high cam surface 638 formed on a portion thereof, as shown clearly in FIG. 6. As shown in FIGS. 6 and 7, the control cam 630 is pivotally secured in the recorder 76 or 78 via a cam shaft 640, which is pivotally secured to the control cam 630 generally near the end 632 thereof.

As shown in FIGS. 6 and 7, the continuous indicator 92 or 114 includes, a recorder arm 642 having a marking end 644 formed on one end portion thereof. The control cam 630 is securely connected to a portion of the end of the recorder arm 642, opposite the marking end 634 thereof, generally near the end 632 of the control cam 630. The marking end 644 of the recorder arm 642 is adapted to continuously and permanently mark a portion of a chart 646, in such a manner that the mark made thereby provides a record of a particular drilling-fluid parameter over a predetermined period of time. As indicated in FIGS. 6 and 7, the chart 646 is disposed generally between the control cam 630 and the marking end 644 of the recorder arm 642. The utilization of a circular chart and marker adapted to provide a continuous mark upon such a chart is well known in the art, and a detailed description of the contruction and operation thereof is not necessary herein.

As shown in FIGS. 6 and 7, the end 634 of the control cam 630 is gearingly connected to a shaft 650 via a gear 652. The gear 652 is secured to the shaft 650, and the shaft 650 is rotatingly supported in the recorder 76 or 78.

As shown more clearly in FIG. 7, the recorder drive 82 or 106 is, in a preferred form, an electric motor having an output shaft 654. The output shaft 654 of the motor is gearingly connected to the shaft 650 via a gear 656 and a gear 658. The gear 656 is secured to the shaft 654, and the gear 658 is secured to the shaft 650.

It is apparent from the foregoing, that the rotational movement of the shaft 654 is gearingly transmitted to the shaft 650 via the gears 656 and 658, and further that the rotation of the shaft 650 is gearingly transmitted to the control cam 630 via the gear 652 and the geared end 634 of the control cam 630.

As shown more clearly in FIG. 7, the shaft 650 extends through a support 660, and a dial-indicator 662 is secured to the end of the shaft 650. The dial-indicator 662 will thus be rotated, following the rotation of the shaft 650, for reasons to be made more apparent below.

Operation of FIGS. 6 and 7

The recorder drive 82 or 106, as shown more clearly in FIG. 7, is adapted to receive the level-signal 48 or the flow-signal 62, and to drivingly rotate the shaft 654 an incremental degree of rotation in response thereto. The rotation of the shaft 654 is gearingly transmitted to the shaft 650, and thus the dial-indicator 662 and the control cam 630 are moved an incremental amount in response to the rotational movement of the shaft 654. More particularly, the dial-indicator 662 is moved through a certain degree of rotation following the rotational movement of the shaft 650 and the control cam 630 is moved through a certain degree of rotation about the pivot shaft 640 in response to the rotation of the shaft 650.

The dial-indicator 662 cooperates with reference numerals provided on the recorder 76 or 78 to provide a visual and instantaneous indication of the total level change in the drilling-fluid level in the fluid-pits 12, or to indicate the flow of drilling-fluid in the return flow pipeline 36, depending upon whether the apparatus shown in FIGS. 6 and 7 is utilized in the first recorder 76 or the second recorder 78. The use of a dial-indicator to provide an instantaneous indication of a particular parameter is well known in the art, and a detailed description of the recorder case and the placement of the numerals thereabout to cooperate with the rotational movement of the dial-indicator 662 is not required herein.

Since the recorder arm 642 is securely affixed to a portion of the control cam 630, the position of the marking end 644 with respect to the chart 646 will be controllably positioned by the incremental movement of the control cam 630. Thus, the rotation of the shaft 650 will controllingly position the marking end 644 on the chart 646 via the gearing interconnection between the shaft 650 and the recorder arm 642 provided by the gear 652 and the control cam 630. The recorder arm 642 and, more particularly, the marking end 644 thereof, thus cooperates to provide a continuous indication of either the total level change of drilling-fluid in the fluid-pits 12, or the drilling-fluid flow in the return flow pipeline 36 over a predetermined period of time, depending upon whether the apparatus is utilized in the first recorder 76 or the second recorder 78.

The low-switch 400 or 404 and the high-switch 402 or 406 are positioned on the high-low actuator 98 or 120, such that in the normal operating position of the control-monitoring apparatus 10, the control cam 630 is not in engagement with either the low-switch 400 or 404, nor the high-switch 402 or 406. When the signal to the recorder drive 82 or 106 reaches a predetermined high level, the incremental degree of rotation transmitted to the control cam 630 will cause the control cam 630 to rotate to a position wherein the low cam surface 636 actuatingly contacts the low-switch 400 or 404, thereby closing the low-switch 400 or 404. When the control signal to the recorder drive 82 or 106 reaches a predetermined low level, the recorder drive 82 or 106 will cause the control cam 630 to be rotated to a position wherein the high cam surface 638 actuatingly engages the high-switch 402 or 406 thereby closing the high-switch 402 or 406.

It is apparent from the foregoing, that by changing the position of the carrier 600 or the carrier 606 on the high-low actuator 98 or 120, the degree of rotation required to bring the cam surfaces 636 or 638 into an actuating engagement with the low-switch 400 or 404 or the high-switch 402 or 406 is controllably altered thereby. Thus, by turning the control knobs 624 or 626, the operator can alter the actuating low level or the actuating high level of the high-low actuator 98 or 120.

In a preferred form, the various control components, shown in FIGS. 6 and 7, are utilized in both the first recorder 76 and the second recorder 78. In this embodiment of the invention, it is also apparent from the foregoing that the output drive-signal 84 or 108 of the first recorder drive 82 or the second recorder drive 106 refers, more particularly, to the incremental degree of rotation of the shaft 654 in response to the particular input control signal. The output indication-signal 94 or 116 of the instantaneous indicator 90 or 112 refers, more particularly, to the position of the dial-indicator 662, and the output indications-signals 96 and 118 of the continuous indicator 92 or 114 refers, more particularly, to the marking of the chart 646 by the marking end 644.

Embodiment of FIG. 8

A preferred embodiment of a remote pit level indicator 142, and the cooperating components of the first recorder 76 are shown in detail in FIG. 8. It should be particularly noted, that all of the components of the first recorder 76 are not shown in FIG. 8, but rather only those components necessary to describe the operation of the remote pit level indicator 142.

As shown in FIG. 8, a first servo-control motor 700 having a servo shaft 702 is supported in the first recorder 76. The servo shaft 702 is gearingly connected to the recorder shaft 650 via a pair of bevel gears 704 and 706. The gear 704 is, more particularly, secured to the servo shaft 702, and the gear 706 is, more particularly, secured to the recorder shaft 650.

The servo-control motor 700 is connected to a second servo-control motor 708, which is supported in the remote return flow indicator 142. The second servo-control motor 708 has an output servo shaft 710, which is gearingly connected to a shaft 712 via a pair of bevel gears 714 and 716. The bevel gear 716 is secured to the shaft 712, the bevel gear 714 being secured to the servo shaft 710.

The first servo-control motor 700 and the second servo-control motor 708 are interconnected such that the rotational output of the servo shaft 710 is directly proportional or, as referred to in the art, slavingly follows the rotation of the servo shaft 702 of the first servo-control motor 700. The servo-control motors 700 and 708 are, in a preferred form, synchro-control motors, and the interconnection between two servo-control motors, in a manner as indicated above with respect to the first servo-control motor 700 and the second servo-control motor 708, is well known in the art and a detailed description of the interconnection therebetween and the operation thereof is not required herein.

The shaft 712 is rotatingly supported in the remote pit level indicator 142, as shown in FIG. 8. One end of the shaft 712 is in biasing engagement with a biasing spring 720, which is disposed in a retainer 722 secured to a portion of the remote pit level indicator 142. As shown in FIG. 8, one end portion of the shaft 712 is also supported in a portion of the retainer 722. The biasing spring 720 is sized to bias the shaft 712 in a general direction 724, as indicated in FIG. 8. The bevel gears 714 and 716 are disposed and the bias spring 720 is sized such that, in an operating position of the remote return flow indicator 142, the biasing spring 720 biases the shaft 712 in the direction 724 to a position wherein the bevel gears 714 and 716 are in gearing engagement.

A knob 726 is secured on one end of the shaft 712 opposite the end thereof in biasing engagement with the spring 720. The knob 726 is disposed on the remote return flow indicator 142 such that an operator can move the knob in a general direction 728 thereby moving the shaft 712 against the biasing force of the spring 720. The knob 726 and the shaft 712 are further positioned and disposed such that the shaft 712 can be moved a sufficient distance in the direction 728 to disengage the gearing interconnection between the bevel gears 714 and 716, for reasons to be made apparent below.

A dial-indicator 730 is secured to the shaft 712, generally near the knob 726 end thereof. The dial 730 thus provides a visual output indication response to the rotation of the shaft 712.

It should be noted, that in a preferred form, the bevel gears 702 and 706, and the bevel gears 714 and 716 are cooperatingly sized such that the incremental degree of rotation of the shaft 650 is amplified, thus resulting in a proportionally greater degree of rotation of the shaft 712 in the remote return flow indicator 142. In this manner, a small indication of drilling-fluid level in the fluid-pits 12 will produce a greater degree of rotation of the dial-indicator 730 of the remote pit level indicator 142, and thus be more readily perceptible at a greater distance by an operator.

Operation of FIG. 8

The remote pit level indicator 142, as described above, is particularly adapted to provide a visual indication of a particular parameter at a remote position with respect to the main recorder, or more particularly, the first recorder 76. The output drive signal 84 of the first recorder drive 82, or more particularly, the incremental rotation of the shaft 654 of the first recorder drive 82, gearingly drives the shaft 702 of the first servo-control motor 700. Since the second servo-control motor 708 is connected to the first servo-control motor 700 in such a manner that the rotational movement shaft 710 of the second servo-control motor 708 slavingly follows the rotational movement of the shaft 702 of the first servo-control motor 700, it will be apparent to those skilled in the art that the shaft 712 of the remote pit level indicator 142 will rotate an incremental amount in response to the rotational movement of the shaft 654 of the first recorder drive 82.

The dial-indicator 730 of the remote pit level indicator 142 will thus be moved through a particular incremental degree of rotation following the rotation of the shaft 712, and thereby provide a visual output indication responsive to the rotational movement of the shaft 654 of the first recorder drive 82. More particularly, the dial-indicator 730 will thus provide a visual output indication of the level of drilling-mud in the fluid-pits 12 at a remote location with respect to the position of the first recorder 76.

The remote pit level indicator is also constructed such that the operator can easily and conveniently set the dial-indicator 730 to a zero position. To zero the dial-indicator 730, the operator will initially move the shaft 712 in a direction 728 against the biasing force of the spring 720 to a position wherein the bevel gears 714 and 716 are disengaged. In the disengaged position of the bevel gears 714 and 716, the operator can then rotate the shaft 712 via the knob 726, and position the dial-indicator 730 in the proper zero position.

When the drilling pipe or a portion thereof is removed from the borehole 30, the level of drilling-fluid in the borehole 30 will be lowered, as described before with respect to the changing of a drill-bit. In this position, the operator will initially zero the remote pit level indicator 142 or, in other words, move the dial-indicator 730 to the zero position, as described above. After zeroing the dial-indicator 730, the borehole 30 is filled with drilling-fluid, in a manner as described before.

The filling of the borehole 30 with drilling-fluid will cause the dial-indicator 730 to be moved or positioned on the remote pit level indicator 142, to indicate the lowering of the level of drilling-fluid in the fluid-pits 12. When the drill-pipe is replaced in the borehole 30, the drilling-fluid will be returned to the fluid-pits 12 via the return flow pipeline 36.

The returning of the drilling-fluid to the fluid-pits 12, should cause the dial-indicator 730 on the remote pit level indicator 142 to be returned or again positioned substantially near the zero position thereof. If the dial-indicator 730 does not return substantially to the zero position, a possible problem is indicated to the operator such as, for example, a gas bubble in the borehole 30 or a loss of drilling-fluid in the borehole 30.

As mentioned before, the control-monitoring apparatus 10, described above, thus provides immediate, reliable, audible and visual indications of the various drilling-fluid parameters which are required by the operator during drilling operation. The drilling-fluid indication apparatus 74 is particularly adapted and constructed to cooperate in a drilling-fluid circulation system to indicate the drilling-fluid level-change in the fluid-pits 12, and to indicate the relative flow of drilling-fluid in the return flow pipeline 36 in a quick, convenient and immediately useable form. The drilling-fluid indication apparatus 74 also provides an indication of the volume of drilling-fluid required to initially fill the borehole, prior to the commencement of the drilling operation.

It should also be noted that although some of the control components cooperating in the control-monitoring apparatus 10 have been described in detail above as being of the electrical, pneumatic, hydraulic or fluidic type of control component, that in view of the detailed description above, interchangeable analogues between the basic types of control systems will be apparent to those skilled in the art.

Changes may be made in the construction and arrangement of the parts or the elements of the various embodiments as disclosed herein without departing from the spirit and scope of the invention as defined in the following claims.

What is claimed is:

1. A control-monitoring apparatus adapted to cooperate in a drilling-fluid circulation system, comprising:
   a fluid-pit for retaining a volume of drilling-fluid;
   a pump connected between the fluid-pit means and the borehole pumping drilling-fluid from the fluid-pit means into the borehole in one position thereof;
   a return flow pipeline connected between the borehole and the fluid-pit means, some of the drilling-fluid being returned to the fluid-pit means from the borehole via the return flow pipeline;
   level indicating means disposed in the fluid-pit and being constructed and adapted to sense the level of the drilling-fluid in the fluid-pit and to provide an output level-signal indicative of the sensed drilling-fluid level;
   return flow indicator means connected to the return flow pipeline and being constructed and adapted to indicate the flow of drilling-fluid through the return flow pipeline, and to provide an output return flow-signal indicative of the sensed flow of drilling-fluid; and
   a drilling-fluid control indication apparatus, comprising:
      a first recorder means, comprising:
         a first recorder drive means constructed and adapted to receive the output level-signal from the level indicating means and to provide an output drive-signal in response thereto;
         a pit indicating means constructed and adapted to receive the output drive-signal from the first recorder drive means and to provide an output level indication-signal indicative of the drilling-fluid level in the fluid-pit; and
      a second recorder means, comprising:

a second recorder drive means constructed and adapted to receive the output return flow-signal from the return flow indicator means and to provide an output drive-signal in response thereto; and a return-flow indicating means constructed and adapted to receive the output drive-signal from the second recorder drive means and to provide an output flow indication-signal indicative of the drilling-fluid flow through the return flow pipeline.

2. The control-monitoring apparatus of claim 1 defined further to include:

a pump transducer means connected to the pump and being constructed and adapted to provide an output flow-signal indicative of the volume of drilling-fluid being moved through the pump; and wherein the drilling-fluid control indication apparatus is defined further to include:

a register means constructed and adapted to receive the output flow-signal from the pump transducer means to provide an output volume indication-signal indicative of the volume of drilling-fluid being moved through the pump.

3. The control-monitoring apparatus of claim 2 wherein the drilling-fluid control indication apparatus is defined further to include:

a continuity actuator means interposed between the pump transducer means and the register means and being constructed and adapted to receive the return flow-signal from the pump transducer means, the continuity actuator means having an actuated and a deactuated position, the return flow-signal from the pump transducer means being connected to the register means in an actuated position of the continuity actuator means and the pump transducer means being disconnected from the register means in a deactuated position of the continuity actuator means; and means to actuate the continuity actuator means.

4. The control-monitoring apparatus of claim 3 wherein the continuity actuator means is further defined to include:

a relay means having an energized position and a de-energized position, the relay means being connected to the pump transducer means and the register means to establish continuity therebetween in an energized position of the relay means; and means to energize the relay means in one position thereof.

5. The control-monitoring apparatus of claim 1 defined further to include:

a remote pit indicating means connected to the output drive-signal from the first recorder drive means and being constructed and adapted to provide a remote output level indication-signal indicative of the drilling-fluid level in the fluid-pits.

6. The control-monitoring apparatus of claim 1 wherein the drilling-fluid circulation system includes more than one fluid-pit, and wherein the level indicating means is defined further to include: a level indicating means disposed in each fluid-pit, each level indicating means being connected in series to the other level indicating means to provide an output level-signal indicative of the total drilling-fluid level in the fluid-pits.

7. The control-monitoring apparatus of claim 6 wherein each level indicating means is further defined as being constructed and connected to the other level indicating means to provide an output level-signal indicative of the total drilling-fluid level change in the fluid-pits.

8. The control-monitoring apparatus of claim 7 wherein each level indicating means is further defined to include:

a float means disposed in the fluid-pit in contact with the drilling-fluid, the position of the float means being changed as the drilling-fluid level changes; and a variable resistor means connected to the float means, the resistance of the resistor means being altered by the float means in response to a change of position of the float means, the resistor means being connected in series with the resistor means of the other level indicating means, the output level-signal being responsive to the total resistance change of the interconnected resistor means.

9. The control-monitoring apparatus of claim 7 wherein the first recorder drive means is further defined to include:

a first recorder shaft rotatingly supported in the first recorder means; and a first recorder motor having an output drive shaft drivingly connected to the first recorder shaft, the first recorder motor being constructed and adapted to receive the output level-signal from the level indicating means and to drivingly rotate the first recorder shaft in response to a change of the output level-signal.

10. The control-monitoring apparatus of claim 9 wherein the pit indicating means is further defined to include:

a dial-indicator secured to one end of the first recorder shaft, the dial-indicator movement thereby providing an instantaneous visual indication of the drilling-fluid level change in the fluid-pits.

11. The control-monitoring apparatus of claim 7 wherein the second recorder drive means is further to include:

a second recorder shaft rotatingly supported in the second recorder means; and a second recorder motor having an output drive shaft drivingly connected to the second recorder shaft, the second recorder motor being constructed and adapted to receive the output flow indication signal from the return-flow indicating means and to drivingly rotate the second recorder shaft in response to a change of the output flow indication signal.

12. The control-monitoring apparatus of claim 11 wherein the return flow-indicating means is further defined to include:

a dial-indicator secured to one end of the secnd recorder shaft, the dial-indicator thereby providing an instantaneous, visual indication of the drilling-fluid flow in the return flow line.

13. The control-monitoring apparatus of claim 1 wherein the return flow indicator means is further defined to include:

a paddle means, having opposite ends, and being disposed in a portion of the return flow pipeline in a position wherein a portion of the paddle means contacts the drilling-fluid flowing in the return flow line, thereby moving the paddle means;

a paddle shaft having a portion thereof secured to one end portion of the paddle means, the movement of the paddle means by the drilling-fluid thereby rotating the paddle shaft;

a return flow transducer housing having a shaft aperture formed through a portion thereof, the shaft aperture sized to rotatingly receive a portion of the paddle shaft extending therethrough;

moisture-seal means connected to a portion of the paddle shaft and to a portion of the return flow transducer housing to provide a moisture-tight seal between paddle shaft and the return flow transducer housing; and return flow transducer means supported in the return flow transducer housing and being connected to one end portion of the paddle shaft, the return flow transducer means being constructed and adapted to provide the output return flow-signal in response to the rotational movement of the paddle shaft.

14. A control-monitoring apparatus adapted to cooperate in a drilling-fluid circulation system, comprising:

a plurality of fluid-pits, each fluid-pit for retaining a volume of drilling fluid;

a pump connected between the fluid-pit means and the borehole pumping drilling-fluid from the fluid-pit means into the borehole in one position thereof;

a return flow pipeline connected between the borehole and the fluid-pit means, some of the drilling-fluid being returned to the fluid-pit means from the borehole via the return flow pipeline;

level indicating means disposed in each fluid-pit, each level indicating means being connected in series to the other level indicating means to provide an output level-signal indicative of the sensed drilling-fluid level and indicative of the total drilling-fluid level change in the fluid pits;

return flow indicator means connected to the return flow pipeline and being constructed and adapted to indicate the flow of drilling-fluid through the return flow pipeline, and to provide an output return flow-signal indicative of the sensed flow of drilling-fluid; and a drilling-fluid control indication apparatus, comprising:

first recorder means, comprising:
first recorder drive means constructed and adapted to receive the output level-signal from the level indicating means and to provide an output drive-signal in response thereto, including:
first recorder shaft rotatingly supported in the first recorder means; and
a first recorder motor having an output drive shaft drivingly connected to the first recorder shaft, the first recorder motor being constructed and adapted to receive the output level-signal from the level indicating means and to drivingly rotate the first recorder shaft in response to a change of the output level-signal;
pit indicating means constructed and adapted to receive the output drive-signal from the first recorder drive means and to provide an output level indication-signal indicative of the drilling-fluid level in the fluid-pit, including:
a dial-indicator secured to one end of the first recorder shaft, the dial-indicator movement thereby providing an instantaneous visual indication of the drilling-fluid level change in the fluid-pits;
chart means supported in the first recorder means;
a recorder arm having a marking end, the marking end being positioned on a portion of the chart means and adapted to continuously mark the portion of the chart means thereunder; and
a control cam, having opposite ends, one end portion thereof and being connected to the end portion of the recorder arm opposite the marking end thereof, and the other opposite end of the control cam being connected to first recorder shaft, the control cam being moved by the rotation of the first recorder shaft, thereby positioning the marking end of the recorder arm on the chart means in response to the rotation of the drive shaft of the first recorder motor, the mark on the chart means made by the marking end thereby indicating the drilling-fluid level change in the fluid-pits over a predetermined period of time;
second recorder means, comprising:
a second recorder drive means constructed and adapted to receive the output return flow-signal from the return flow indicator means and to provide an output drive-signal in response thereto; and
a return-flow indicating means constructed and adapted to receive the output drive-signal from the second recorder drive means and to provide an output flow indication-signal indicative of the drilling-fluid flow through the return flow pipeline.

15. The control-monitoring apparatus of claim 14 wherein the first recorder means is defined further to include:
a high-low pit actuator means constructed and adapted to receive the output drive-signal of the first recorder drive means and to provide an output high-signal when the output drive-signal of the first recorder drive means reaches a preset high level and to provide an output low-signal when the output drive-signal of the first recorder means reaches a preset low level, thereby indicating a predetermined high and a predetermined low drilling-fluid level change in the fluid-pits.

16. The control-monitoring apparatus of claim 15 wherein the control cam includes; a high cam surface and a low cam surface formed on a portion thereof; and wherein the high-low pit actuator means is further defined to include:

a high-switch means constructed and adapted to provide the output high signal in an actuated position thereof, and being positioned and supported in the first recorder means to cooperate with the control cam, the high-switch means being actuated by the high cam surface in one position of the control cam; and a low-switch means constructed and adapted to provide the output low signal in an actuated position thereof, and being positioned and supported in the first recorder means to cooperate with the control cam, the low-switch means being actuated by the low cam surface in one position of the control cam.

17. The control-monitoring apparatus of claim 16 wherein the high-low pit actuator means is further defined to include:

an elongated high screw means turningly supported in the first recorder means;

means to turn the high screw means; an elongated low screw means turningly supported in the first recorder means; and means to turn the low screw means; and wherein the high-switch means is further defined as being threadedly supported on the high screw means, the position of the high-switch means with respect to the high cam surface defining the actuating preset high level, the position of the high-switch means with respect to the high cam surface being altered by the turning of the high screw means, the actuating preset high level being thereby adjustable; and wherein the low-switch means is further defined as being threadedly supported on the low screw means, the position of the low-switch means with respect to the low cam surface defining the actuating preset low level, the position of the low-switch means with respect to the low cam surface being altered by the turning of the low screw means, the actuating preset low level being thereby adjustable.

18. The control-monitoring apparatus of claim 14 wherein the high-low pit actuator means is further defined to include:

a high-switch means having an opened and a closed position, the high-switch means being adapted to receive the output drive-signal of the first recorder drive means, the high-switch means being moved to the closed position when the output drive-signal of the first recorder drive means reaches a preset high level, thereby providing an output high signal in the closed position of the high-switch means;

a low-switch means having an opened and a closed position, the low-switch means being adapted to receive the output drive-signal of the first recorder drive means, the high-switch means being moved to the closed position when the output drive-signal of the first recorder drive means reaches a preset low level, thereby providing an output low signal in the closed position of the low-switch means;

a high level indicating means connected to the high-switch means and being connected thereto and adapted to provide a high level indication in the closed position of the high-switch means; and a low level indicating means connected to the low-switch means and being connected thereto and adapted to provide a low level indication in the closed position of the low-switch means.

19. The control-monitoring apparatus of claim 18 wherein the high level indicating means and the low level indicating means each are defined further to include:

a lamp indicator means to provide a visual indication; and a speaker means to provide an audible indication.

20. A control-monitoring apparatus adapted to cooperate in a drilling-fluid circulation system, comprising:

a plurality of fluid-pits, each fluid-pit for retaining a volume of drilling-fluid;

a pump connected between the fluid-pit means and the borehole pumping drilling-fluid from the fluid-pit means into the borehole in one position thereof;

level indicating means disposed in each fluid-pit, each level indicating means being connected in series to the other level indicating means to provide an output level-signal indicative of the sensed drilling-fluid level and indicative of the total drilling-fluid level change in the fluid-pits;

return flow indicator means connected to the return flow pipeline and being constructed and adapted to indicate the flow of drilling-fluid through the return flow pipeline, and to provide an output return flow-signal indicative of the sensed flow of drilling-fluid; and a drilling-fluid control indication apparatus comprising:

first recorder means, comprising:

a first recorder drive means constructed and adapted to receive the output level-signal from the level indicating means and to provide an output drive-signal in response thereto;

a pit indicating means constructed and adapted to receive the output drive-signal from the first recorder drive means and to provide an output level indication-signal indicative of the drilling-fluid level in the fluid-pit; and second recorder means, comprising:

a second recorder drive means constructed and adapted to receive the output return flow-signal from the return flow indicator means and to provide an output drive-signal in response thereto, including:

a second recorder shaft rotatingly supported in the second recorder means; and a second recorder motor having an output drive shaft drivingly connected to the second recorder shaft, the second recorder motor being constructed and adapted to receive the output flow indication signal from the return-flow indicating means and to drivingly rotate the second recorder shaft in response to a change of the output flow indication signal;

return flow indicating means constructed and adapted to receive the output drive-signal from the second recorder drive means and to provide an output flow indication-signal indicative of the drilling-fluid flow through the return flow pipeline, comprising:

a dial-indicator secured to one end of the second recorder shaft, the dial-indicator thereby providing an instantaneous, visual indication of the drilling-fluid flow in the return flow line;

chart means supported in the second recorder means;

a recorder arm having a marking end, the marking end being markingly positioned on a portion of the chart means and adapted to continuously mark the portion of the chart means thereunder; and a control cam, having opposite ends, one end portion thereof being connected to the end portion of the recorder arm opposite the marking end thereof, and the other opposite end of the control cam being connected to the second recorder shaft, the control cam being moved by the rotation of the second recorder shaft, thereby positioning the marking end of the recorder arm on the chart means in response to the rotation of the drive shaft of the second recorder motor, the mark on the chart means made by the marking end thereby indicating the flow of drilling-fluid in the return flow pipeline over a predetermined period of time.

21. The control-monitoring apparatus of claim 20 wherein the second recorder means is defined further to include:

a high-low flow actuator means constructed and adapted to receive the output drive-signal from the second recorder drive means, and to provide an output high-signal when the output drive-signal of the second recorder drive means reaches a preset high level and to provide an output low-signal when the output drive-signal of the second recorder means reaches a preset low level, thereby indicating a predetermined high level and a predetermined low level of drilling-fluid flow in the return flow pipeline.

22. The control-monitoring apparatus of claim 21 wherein the control cam includes; a high cam surface and a low cam surface formed on a portion thereof; and wherein the high-low flow actuator means is defined further to include:

a high-switch means constructed and adapted to provide the output high signal in an actuated position thereof and being positioned and supported in the second recorder means to cooperate with the control cam, the high-switch means being actuated by the high cam surface, in one position of the control cam; and a low-switch means constructed and adapted to provide the output low signal in an actuated position thereof, and being positioned in the second recorder means to cooperate with the control cam, the low-switch means being actuated by the low cam surface in one position of the control cam.

23. The control-monitoring apparatus of claim 22 wherein the high-low flow actuator means is defined further to include:

an elongated high screw means turningly supported in the second recorder means;

means to turn the high screw means;

an elongated low screw means turningly supported in the second recorder means; and means to turn the low screw means; and wherein the high-switch means is further defined as being threadedly supported on the high screw means, the position of the high screw means with respect to the high cam surface defining the actuating preset high level, the position of the high-switch means with respect to the high cam surface being altered by the turning of the high screw means, the actuating preset high level being thereby adjustable; and wherein the low-switch means is further defined as being threadedly supported on the low screw means, the position of the low-switch means with respect to the low cam surface defining the actuating preset low level, the position of the low-switch means with respect to the low cam surface being altered by the turning of the low screw means, the actuating preset low level being thereby adjustable.

24. The control-monitoring apparatus of claim 20 wherein the high-low flow actuator means is further defined to include:

a high-switch means having an opened and a closed position, the high-switch means being adapted to receive the output drive-signal of the second recorder drive means, the high-switch means being moved to the closed position when the output drive-signal of the second recorder drive means reaches a preset high level, thereby providing an output high signal in the closed position of the high-switch means;

a low-switch means having an opened and a closed position, the low-switch means being adapted to receive the output drive-signal of the second recorder drive means, the high-switch means being moved to the closed position when the output drive-signal of the second recorder drive means reaches a preset low level, thereby providing an output low signal in the closed position of the low-switch means;

a high flow indicating means connected to the high-switch means and being connected thereto and adapted to provide a high flow indication in the closed position of the high-switch means; and a low flow indicating means connected to the low-switch means and being connected thereto and adapted to provide a low flow indication in the closed position of the low-switch means.

25. The control-monitoring apparatus of claim 24 wherein the high flow indicating means and the low flow indicating means each are defined further to include:

a lamp indicator means to provide a visual indication; and a speaker to provide an audible indication.

26. The control-monitoring apparatus of claim 24 is defined further to include:

a flow switch means having an opened and a closed position connected to the low-switch means, the flow switch means being in electrical continuity with the low flow indicating means in the closed position of the flow switch means and in the closed position of the low-switch means; and means connected to the flow switch means, and being adapted to receive the output flow indication signal from the return flow indicating means and to close the flow switch means when the output flow indication signal indicates drilling-fluid flow in the return flow pipeline thereby establishing electrical continuity between the low flow indicating means and the flow switch means via the low-switch means, in a closed position of the low-switch means.

27. A control-monitoring apparatus adapted to cooperate in a drilling-fluid circulation system, comprising:
 a plurality of fluid-pits, each fluid-pit for retaining a volume of drilling fluid;
 a pump connected between the fluid-pit means and the borehole pumping drilling-fluid from the fluid-pit means into the borehole in one position thereof;
 a return flow pipeline connected between the borehole and the fluid-pit means, some of the drilling-fluid being returned to the fluid-pit means from the borehole via the return flow pipeline;
 level indicating means disposed in each fluid-pit, each level indicating means being connected in series to the other level indicating means to provide an output level-signal indicative of the sensed drilling-fluid level and indicative of the total drilling-fluid level change in the fluid-pits;
 return flow indicator means connected to the return flow pipeline and being constructed and adapted to indicate the flow of drilling-fluid through the return flow pipeline, and to provide an output return flow-signal indicative of the sensed flow of drilling-fluid; and
 a drilling-fluid control indication apparatus, comprising:
  a first recorder means, comprising:
   first recorder drive means constructed and adapted to receive the output level-signal from the level indicating means and to provide an output drive-signal in response thereto, including:
    a first recorder shaft rotatingly supported in the first recorder means; and
    a first recorder motor having an output drive shaft drivingly connected to the first recorder shaft, the first recorder motor being constructed and adapted to receive the output level-signal from the level indicating means and to drivingly rotate the first recorder shaft in response to a change of the output level-signal;
   a pit indicating means constructed and adapted to receive the output drive-signal from the first recorder drive means and to provide an output level indication-signal indicative of the drilling-fluid level in the fluid-pit;
   a first servo-control means having an output servo shaft connected to the first recorder shaft, the rotation of the servo shaft thereby being responsive to the rotation of the first recorder shaft;
  a second recorder means, comprising:
   second recorder drive means constructed and adapted to receive the output return flow-signal from the return flow indicator means and to provide an output drive-signal in response thereto; and
   a return-flow indicating means constructed and adapted to receive the output drive-signal from the second recorder drive means and to provide an output flow indication-signal indicative of the drilling-fluid flow through the return flow pipeline;
 a remote pit indicating means, comprising:
  a shaft rotatingly supported in a portion of the remote pit level indicating means; and
  a second servo-control means having an output servo shaft drivingly connected to a portion of the shaft in the remote pit indicating means, the second servo-control means being connected to the first servo-control means so that the second servo means drivingly rotates the shaft in the remote pit indicating means in response to the rotation of the servo shaft of the first servo-control means.

28. The control-monitoring apparatus of claim 27 wherein the remote pit indicating means is further defined to include:
 a gear means connected to the shaft of the second servo-control means and to the shaft in the remote pit indicating means, the gear means thereby providing the driving connection therebetween, the gear means being sized to amplify the rotational movement of the servo shaft of the second servo-control means, the incremental degree of rotation of the shaft in the remote pit indicating means being thereby greater than the rotation of the shaft of the first recorder means.

29. The control-monitoring apparatus of claim 28 wherein the remote pit indicating means is further defined to include:
 a biasing means supported in the remote pit indicating means, a portion of the biasing means being in biasing engagement with the shaft in the remote pit indicating means, the biasing means being sized and disposed to biasingly maintain the gearing interconnection between the shaft of the second servo-control means and the shaft in the remote pit indicating means; and
 wherein the shaft in the remote pit indicating means is further defined as being slidably disposed therein, the gearing interconnection between the shaft of the second servo-control means the shaft of the remote pit indicating means being disconnected by the sliding of the shaft in the remote pit indicating means a predetermined distance against the biasing force of the biasing means, the shaft in the remote pit indicating means being thereby rotatable to a predetermined position.

30. The control-monitoring apparatus of claim 29 wherein the remote pit indicating means is further defined to include:
 a dial-indicator secured to one end of the shaft in the remote return flow indicating means, the dial-indicator thereby providing an instantaneous, visual indication of the drilling-fluid level in the fluid-bits at a remote position with respect to the first recorder means.

31. A control-monitoring apparatus adapted to cooperate in a drilling-fluid circulation sytem, comprising:
- a fluid-pit for retaining a volume of drilling-fluid;
- a pump connected between the fluid-pit means and the borehole pumping drilling-fluid from the fluid-pit means into the borehole in one position thereof;
- a return flow pipeline connected between the borehole and the fluid-pit means, some of the drilling-fluid being returned to the fluid-pit means from the borehole via the return flow pipeline;
- level indicating means disposed in the fluid-pit and being constructed and adapted to sense the level of the drilling-fluid in the fluid-pit and to provide an output level-signal indicative of the sensed drilling-fluid level;
- return flow indicator means connected to the return flow pipeline and being constructed and adapted to indicate the flow of drilling-fluid through the return flow pipeline, and to provide an output return flow-signal indicative of the sensed flow of drilling-fluid, comprising:
  - a paddle means, having opposite ends, and being disposed in a portion of the return flow pipeline in a position wherein a portion of the paddle means contacts the drilling-fluid flowing in the return flow line, thereby moving the paddle means;
  - a paddle shaft having a portion thereof secured to one end portion of the paddle means, the movement of the paddle means by the drilling-fluid thereby rotating the paddle shaft;
  - a return flow transducer housing having a shaft aperture formed through a portion thereof, the shaft aperture sized to rotatingly receive a portion of the paddle shaft extending therethrough;
  - moisture-seal means connected to a portion of the paddle shaft an to a portion of the return flow transducer housing to provide a moisture-tight seal between paddle shaft and the return flow transducer housing, comprising:
    - a hollow stationary member, having opposite ends and an outer periphery, one end of the stationary member being sealingly secured to the return flow transducer housing, the hollow portion of the stationary member encompassing the shaft aperture and a portion of the paddle shaft, the paddle shaft being freely rotatable therein;
    - a lip portion formed on the end of the stationary member opposite the end thereof secured to the return flow transducer housing, the lip portion extending a distance radially from the stationary member about the outer periphery thereof; and
    - a hollow rotating member, having opposite ends and an inner and an outer periphery, one end of the rotating member being secured to a portion of the paddle shaft, the end of the rotating member, opposite the end thereof secured to the paddle shaft, extending a distance axially over the lip portion of the stationary member;
  - return flow transducer means supported in the return flow transducer housing and being connected to one end portion of the paddle shaft, the return flow transducer means being constructed and adapted to provide the output return flow-signal in response to the rotational movement of the paddle shaft; and
- a drilling-fluid control indication apparatus comprising:
  - a first recorder means, comprising:
    - a first recorder drive means constructed and adapted to receive the output level-signal from the level indicating means and to provide an output drive-signal in response thereto;
    - a pit indicating means constructed and adapted to receive the output drive-signal from the first recorder drive means and to provide an output level indication-signal indicative of the drilling-fluid level in the fluid-pit; and
  - a second recorder means, comprising:
    - a second recorder drive means constructed and adapted to receive the output return flow-signal from the return flow indicator means and to provide an output drive-signal in response thereto; and
    - a return-flow indicating means constructed and adapted to receive the output drive-signal from the second recorder drive means and to provide an output flow indication-signal indicative of the drilling-fluid flow through the return flow pipeline.

32. A control-monitoring apparatus adapted to cooperate in a drilling-fluid circulating system, comprising:
- a fluid-pit for retaining a volume of drilling-fluid;
- a pump connected between the fluid-pit means and the borehole pumping drilling-fluid from the fluid-pit means into the borehole in one position thereof;
- a return flow pipeline connected between the borehole and the fluid-pit means, some of the drilling-fluid being returned to the fluid-pit means from the borehole via the return flow pipeline;
- level indicating means disposed in the fluid-pit and being constructed and adapted to sense the level of the drilling-fluid in the fluid-pit and to provide an output level-signal indicative of the sensed drilling-fluid level;
- return flow indicator means connected to the return flow pipeline and being constructed and adapted to indicate the flow of drilling-fluid through the return flow pipeline, and to provide an output return flow-signal indicative of the sensed flow of drilling-fluid; and
- a drilling-fluid control indication apparatus, comprising:
  - a first recorder means, comprising:
    - a first recorder drive means constructed and adapted to receive the output level-signal from the level indicating means and to provide an output drive-signal in response thereto;
    - a pit indicating means constructed and adapted to receive the output drive-signal from the first recorder drive means and to provide an output level indication-signal indication of the drilling-fluid level in the fluid-pit; and a second recorder means, comprising:
  a second recorder drive means constructed and adapted to receive the output return flow-signal from the return flow indicator means and to provide an output drive-signal in response thereto; and
  a return-flow indicating means constructed and adapted to receive the output drive-signal from the second recorder drive means and to provide an output flow indication-signal indicative of the drilling-fluid flow through the return flow pipeline;

a pump transducer means connected to the pump and being constructed and adapted to provide an output flow-signal indicative of the volume of drilling-fluid being moved through the pump;

a register means constructed and adapted to receive the output flow-signal from the pump transducer means to provide an output volume indication-signal indicative of the volume of drilling-fluid being moved through the pump;

a continuity actuator means interposed between the pump transducer means and the register means and being constructed and adapted to receive the return flow-signal from the pump transducer means, the continuity actuator means having an actuated and a deactuated position, the return flow-signal from the pump transducer means being connected to the register means in an actuated position of the continuity actuator means and the pump transducer means being disconnected from the register means in a deactuated position of the continuity actuator means, comprising:
  a relay means having an energized position and a de-energized position, the relay means being connected to the pump transducer means and the register means to establish continuity therebetween in an energized positon of th realy mans, comprising:
    a power supply means connected to the relay means to provide energizing power therefor when connected thereto;
    a momentary switch means, having a deactuated and an actuated position, the momentary switch means being interposed between the power supply means and relay means, the momentary switch means connecting the and relay means, the momentary switch means connecting the power supply means to the relay means in an actuated position thereof and disconnecting the power supply means from the relay means in a deactuated position thereof;
    a holding relay means, having an energized position and a deenergized position, the holding relay means being connected to the power supply means and to the relay means, in a de-energized position thereof, the relay means being constructed to provide continuity between the relay means and the power supply means via the holding relay means, in an energized position of the relay means and in a de-energized position of the holding relay means, the relay means thereby cooperating with the holding relay means to maintain the relay means energized after the momentary switch means is moved from an actuated to a deactuated position; and
    means to energize the relay means in one position thereof.

33. The control-monitoring apparatus of claim 32 wherein the means to de-energize the holding relay means is further defined to include:
  a power supply means connected to the holding relay means to provide energizing power therefor when connected thereto;
  a zero flow switch means, having an opened and a closed position, and being interposed between the holding relay means and the power supply means, the zero flow switch means connecting the power supply means to the holding relay means in the closed position thereof, and disconnecting the power supply means from the holding relay means in an opened position thereof; and
  means connected to the zero flow switch means, and being adapted to receive the output flow indication signal from the return flow indicating means and to close the zero flow switch means when the output flow indication signal indicates drilling-fluid flow in the return flow pipeline.

* * * * *